US012329128B2

(12) United States Patent
Roth

(10) Patent No.: US 12,329,128 B2
(45) Date of Patent: Jun. 17, 2025

(54) SYSTEM FOR ANALYZING ANIMAL SECRETION IMAGES

(71) Applicant: PHYTOBIOTICS Futterzusatzstoffe GmbH, Eltville (DE)

(72) Inventor: Hermann Roth, Eltville (DE)

(73) Assignee: PHYTOBIOTICS FUTTERZUSATZSTOFFE GMBH (DE)

(*) Notice: Subject to any disclaimer, the term of this patent is extended or adjusted under 35 U.S.C. 154(b) by 791 days.

(21) Appl. No.: 17/297,911

(22) PCT Filed: Nov. 14, 2019

(86) PCT No.: PCT/EP2019/081348
§ 371 (c)(1),
(2) Date: May 27, 2021

(87) PCT Pub. No.: WO2020/109017
PCT Pub. Date: Jun. 4, 2020

(65) Prior Publication Data
US 2022/0039357 A1 Feb. 10, 2022

(30) Foreign Application Priority Data
Nov. 30, 2018 (EP) .................................... 18209624

(51) Int. Cl.
*A01K 29/00* (2006.01)
*A01K 1/01* (2006.01)
(Continued)

(52) U.S. Cl.
CPC .............. *A01K 29/005* (2013.01); *A01K 1/01* (2013.01); *A01K 31/04* (2013.01); *G06N 20/00* (2019.01);
(Continued)

(58) Field of Classification Search
CPC .................... G06T 7/0012; G06T 2207/30004
See application file for complete search history.

(56) References Cited

U.S. PATENT DOCUMENTS 6,866,863 B2    3/2005  Ribi
2005/0203143 A1*  9/2005  Breslin .................. A61P 25/04
                                                         514/397

(Continued)

FOREIGN PATENT DOCUMENTS

CN          1723715 A      1/2006
CN      105574899 A  *    5/2016
(Continued)

OTHER PUBLICATIONS

Intellectual Property India; India Patent Application No. 202117022857; Office Action; dated Nov. 16, 2022.
(Continued)

*Primary Examiner* — Kevin Ky
(74) *Attorney, Agent, or Firm* — Farber LLC

(57) ABSTRACT

The invention relates to systems and methods for monitoring animals comprising inputting at least one digital image into analysis software that depicts excretions from one or more of the animals and analyzing the image by the analysis software. The method includes outputting a recommended action suitable for maintaining or improving the current physiological state of the animals, wherein the recommended action depends on a result of the analysis of the at least one image or outputting a predicted manifestation of a performance indicator of one or more of the animals, wherein the performance indicator is a physiological parameter, a disease symptom, or a disease, wherein the predicted manifestation depends on a result of the analysis of the at least one image. The systems and methods function to maintain and improve the health of the animals and may
(Continued)

particularly be used for automatic recognition of management error and early detection of emerging diseases and production interruptions.

24 Claims, 9 Drawing Sheets

(51) Int. Cl.
    *A01K 31/04*     (2006.01)
    *G06N 20/00*     (2019.01)
    *G06T 7/00*     (2017.01)

(52) U.S. Cl.
    CPC .. *G06T 7/0012* (2013.01); *G06T 2207/30004* (2013.01)

(56) References Cited

U.S. PATENT DOCUMENTS

| | | | |
|---|---|---|---|
| 2010/0198023 | A1 | 8/2010 | Yanai et al. |
| 2014/0168427 | A1* | 6/2014 | Argue ............... G06V 20/52 382/103 |
| 2015/0240433 | A1 | 8/2015 | Sorbello |
| 2015/0294460 | A1* | 10/2015 | Satish ............... G06T 7/0012 382/128 |
| 2017/0296092 | A1* | 10/2017 | Jones ............... A61B 5/0086 |
| 2019/0062813 | A1* | 2/2019 | Amin ............... B01L 3/5635 |
| 2019/0075756 | A1* | 3/2019 | Albornoz ............... A01K 11/006 |
| 2019/0343758 | A1* | 11/2019 | Wang ............... A61K 9/0053 |

FOREIGN PATENT DOCUMENTS

| | | |
|---|---|---|
| CN | 205691511 U | 11/2016 |
| CN | 106888985 A | 6/2017 |
| CN | 107796473 A | 3/2018 |
| CN | 207263645 U | 4/2018 |
| CN | 208080199 U | 11/2018 |
| DE | 69726135 T2 | 8/2004 |
| EP | 1312311 A1 | 5/2003 |
| JP | S54-62892 A | 5/1979 |
| JP | 2004-501653 A | 1/2004 |
| JP | 2007252805 A | 10/2007 |
| JP | 2018-054443 A | 4/2018 |
| KR | 20120073919 A | 7/2012 |
| KR | 20170078450 A | 7/2017 |
| RU | 2400101 C2 | 9/2010 |
| RU | 2437565 C2 | 12/2011 |
| TW | 201541078 A | 11/2015 |
| WO | WO 2009/091886 A2 | 7/2009 |
| WO | WO 2009/091886 A3 | 7/2009 |
| WO | WO 2015/088345 A1 | 6/2015 |
| WO | WO 2015/115889 A1 | 8/2015 |
| WO | WO2015115889 | 8/2015 |

OTHER PUBLICATIONS

European Patent Office; International Search Report; PCT / EP2019 / 081348; Dec. 4, 2019.

Japan Patent Office; Japanese Patent Application No. 2021-529096; Office Action dated Feb. 21, 2023.

China National Intellectual Property Administration (CNIPA); CN Application No. 201980077664.9; 1st Office Action; dated Sep. 10, 2022.

Russian Federal Service On Intellectual Property; Office Action; RU Patent Application No. 2021114503 dated Dec. 9, 2021.

Russian Federal Service On Intellectual Property; Search Report; RU Patent Application No. 2021114503 dated Dec. 9, 2021.

\* cited by examiner

SYSTEM FOR ANALYZING ANIMAL SECRETION IMAGES

CROSS-REFERENCE TO RELATED APPLICATIONS

This application is a U.S. national stage application from International Application No. PCT/EP2019/081348, filed Nov. 14, 2019, which claims priority from EP 18209624.8, filed Nov. 30, 2018.

FIELD

The present disclosure relates to a computer-assisted method for maintaining one or more animals, in particular to methods which function to maintain and improve the health of the animals. The method may, in particular, be used for automatic recognition of management error and early detection of emerging diseases and production interruptions.

BACKGROUND

Outbreaks of diseases, which may lead to high losses in the animal population, may occur repeatedly when animals are kept together, particularly in factory farms. Due to spatial proximity and sharing communal drinking and feeding locations, diseases may spread quickly and lead to high economic losses due to death or slowed growth of the animals. To minimize the risks and losses, many agriculturalists already administer medications, including antibiotics, for purely prophylactic reasons. On the one hand, this is expensive and has the considerable disadvantage that this promotes the development of multi-resistant pathogens, which may also endanger humans. In addition, these preventative measures are undesired by consumers, and reduce the quality and the market value of the meat, eggs, or milk of these preventatively-treated animals.

Animal diseases are generally determined by personal inspection by the agriculturalist or the veterinarian, as soon as a sufficiently large number of animals is affected. However, since the health tests are only carried out by sampling, and sick animals generally only attract attention in an advanced state of the disease, the outbreak of a disease is typically recognized too late, such that it is often already too late for medical countermeasures. Alternatively, this requires a massive administration of expensive measures and/or measures that are undesired for other reasons, for example, the administration of high doses of antibiotics.

In the meantime, computer-assisted systems and methods for monitoring the health status of groups of animals are known from the prior art. For example, the US patent application US 2010/0198023 A1 describes the use of a database and a plurality of data capture units, in particular different types of sensors, in order to monitor the health of animals in an animal barn. The sensors may comprise, e.g., acoustic sensors, vitality meters, ammonia sensors, visual sensors, and scent sensors.

However, many of the currently used computer-assisted early detection systems still have various technical disadvantages. For example, many types of sensors, which are used for automated monitoring of the health of animals in animal barns, are very expensive to purchase and operate. For example, many sensors, e.g., sensors for certain gases or other vitality indicators, must be installed at suitable locations by trained personnel and regularly monitored. For small agricultural operations, but also for medium to large operations in developing and emerging countries, the use of complicated and expensive sensors is not an option, since there is a lack of money and also a lack of trained personnel to install and monitor the sensors, and also to interpret the measured values. In addition, complex sensors are also prone to failure. When sensors are installed in animal barns, the sensors may be easily contaminated if they come into contact with, e.g., feces, saliva, bedding, feed, or feathers from the animals, and may then deliver incorrect measurement results that are, in the worst case, unnoticed for longer time intervals.

In addition, many of the existing computer-assisted early warning systems have not been tested or have been tested only on a small number of animals and/or barns. It has been shown that even small changes in the environmental parameters may corrupt the measurement or predictive results of many systems which are based solely on measured values from temperature or humidity sensors. Other types of sensors are also often prone to failure or are not very predictive with respect to animal health due to other reasons. I.e., the spatial acoustics in an animal barn depend on the size of the animal barn, and are dependent on which material was used to construct the walls or other furnishings of the barn, that is, factors that have nothing to do with animal health. Humidity and temperature sensors may provide strongly different results, depending on how high above the ground they are mounted and at what distance from a door or a window.

Overall, it may thus be determined that many computer-assisted methods for monitoring animal health in barns and similar locations may not be used in practice, since they are not sufficiently robust with respect to fluctuations of the environmental parameters and since their commissioning and maintenance are too expensive and technically complicated.

What is needed, therefore, are improved systems and methods for monitoring the health of animals that are kept together in groups in farms or other locations.

SUMMARY

The present disclosure provides improved systems and methods for keeping animals. The systems may include computer systems and storage media. The claimed method or the computer system or storage media may be used, in particular for automated detection of deficient husbandry conditions, for early detection of emerging diseases and production interruptions, for monitoring suitable measured values and measurement methods, and/or for manual or automated implementation of actions to improve animal health.

The problems underlying the present disclosure are respectively solved using the features of the independent patent claims. Specific embodiments of the disclosure are specified in the dependent claims. The subsequently explained embodiments and examples are freely combinable with one another, in so far as they are not mutually exclusive.

In one aspect, the present disclosure relates to a method for keeping animals. The animals may be, in particular, farm animals, e.g., pigs, cows, sheep, goats, rabbits, and poultry of all types; however also, in particular, other types of animals, not excluding chickens, laying hens, and turkeys.

The method comprises inputting at least one image into an analysis software. The at least one image is a digital image, which depicts excretions from one or more of the animals. For example, the input of the image into the analysis software may include that the analysis software receives the image directly from an image capture unit, e.g., a camera, or that the analysis software receives the image from a remote computer system via a network or from an image capture unit coupled to this remote computer system. The input of the image may, however, also include reading the at least one image from a storage medium. For example, the analysis software may be installed on a certain computer system and the at least one image may be read from a storage medium of this same computer system.

The analysis software carries out an analysis of the at least one image. Different analysis methods may be used here. Typically, an image analysis is initially carried out in order to extract individual features of the image ("feature analysis/feature extraction"). These features may include, for example, brightness and contrast values, color values (for example, R, G, B values in RGB color images), objects recognized in the image, for example, circles, lines, polygons, or structures (granularity, homogeneity), and other features. The extracted features are then evaluated in order to obtain one or more results of the analysis. For example, a training data set may include images of excretions of worms of a certain type and/or of a certain developmental state, and through training of a machine learning software, the resulting analysis software may be taught to automatically recognize objects of certain contours, colors, texture, and/or size as worms of a specific type over the course of the image analysis.

In another step, the analysis software outputs a recommended action, which is suitable for maintaining or improving the current physiological state of the animals. The recommended action depends on a result of the analysis of the at least one image.

Additionally or alternatively, the analysis software outputs a predicted manifestation of a performance indicator of one or more of the animals. The performance indicator is a physiological parameter, a disease symptom, or a disease. The predicted manifestation depends on a result of the analysis of the at least one image. This may be advantageous because images of feces are readily available. Metadata e.g., currently administered substances (medications, animal feed, additives) may also be easily entered via a GUI of the analysis software.

According to embodiments of the invention, no specialized knowledge or additional equipment or sensors is/are required in order to check the health status of animals of an animal population in an easy, fast, and accurate way, and to quickly undertake suitable measures in order to protect or to improve the health of the animals. A camera for recording the images is available practically everywhere due to the ubiquitous distribution of smartphones. The images of the excretions are not dependent on irrelevant parameters, for example, the size of the barn or whether a window or a door is open, on which, e.g., the temperature and humidity of the barn may depend. The image-based analysis also does not require carrying out difficult and hard to reproduce measurement methods (measurement of internal body temperature), etc.

The excretions are, in particular, feces, preferably "fresh" feces", whose excretion occurred, e.g., less than 12 hours, in particular less than six hours, preferably less than one hour before the point in time of the image recording.

According to embodiments of the invention, the excretions fill at least 40%, preferably at least 60% of the surface of the at least one image. For example, the analysis software may include a filter function which is designed to initially recognize regions on the image that depict an excretion. Images with a surface proportion of imaged feces below a predetermined minimum value are discarded and not considered in the analysis. Alternatively, the analysis software may, if the resolution permits this, automatically consider only a partial image of the received image for analysis, if this partial image includes the required minimum proportion of images of feces. According to some embodiments, the analysis software includes a filter function which discards images if they do not have a certain minimum resolution and/or a certain minimum contrast. The analysis software may preferably output a warning message, which alerts the user of the analysis software to the fact that the at least one input image does not satisfy the required quality criteria, in order to give the user the opportunity to record one or more new images.

According to embodiments of the invention, the recording of the at least one image of excretions includes illuminating the excretions with light from a light source during the recording of the at least one image. The illumination may be very short (photo flash, illumination duration typically shorter than one second) or may also last several seconds.

According to embodiments of the invention, the method comprises transmitting a control command to a lighting unit. For example, the control command may be transmitted from the analysis software or from software assigned to the image capture unit (camera software), e.g., of a smartphone. The control command causes the lighting unit to illuminate the excretions during the recording of the at least one image of the excretions with light of one or more defined wavelength ranges. One of more images of the excretions are then respectively recorded during the illumination of the excretions with light of one or more wavelength ranges. The lighting unit may, in particular, illuminate the excretions sequentially with the light of a plurality of defined wavelength ranges, for example for a few seconds. One or more wavelength-range specific digital images of the excretions are recorded during the illumination with each of the defined wavelength ranges. Optionally, a color reference object with one or more color points may also be illuminated and detected. The analysis software is designed to carry out the analysis selectively, in a wavelength-range specific way, for the one or more images which were recorded with the light of the respective wavelength range.

According to preferred embodiments, the analysis software (or the part of the analysis software designed as the client application) includes an illumination function, e.g., which may be designed as an illumination module of the analysis software. The illumination function is operatively coupled to the light source and may control the same. For example, the illumination function controls the illumination duration and/or the intensity and/or the wavelength range of the light emitted from the light source. The illumination function preferably includes a program to illuminate the excretions with at least two or more light pulses of predefined, different wavelengths or wavelength ranges. The illumination function is preferably also operatively coupled to an image capture unit and able to synchronize the recording of the at least one image with the illumination function. In particular, the synchronization may be designed such that at least one image is recorded and input into the analysis software and/or stored for later use in a database per time interval, in which the excretions are illuminated with one of the predefined, different wavelengths or wavelength ranges of the light source.

The above-described features may be advantageous, since the excretions are now illuminated with the light of different wavelength ranges, and important optical and, in particular, color features of the excretions may be thus better characterized. For example, feces with a high proportion of non-oxidized blood (feces with a light red color) absorbs blue and green light particularly well, while red light is more strongly reflected. Due to sequential illumination of the excretions with light of different wavelength ranges, e.g., blue: 450-482 nm, green: 497-530 nm, red: 620-780 nm, and recording one or more images per wavelength range used, very significant information about the spectral characteristics of the excretions may be obtained from the same excretions, even under poor measurement conditions which are difficult to exactly reproduce (which are typical for the use of smartphone cameras at different locations of the barn, possibly also by different employees).

The light source is preferably a light source which is incorporated into the image capture unit or in the device containing the same, e.g., a smartphone. For example, the light source may be a flash of a camera. In one embodiment, the light source is a smartphone display. This embodiment may be advantageous, as no special equipment (aside from the smartphone) is required in order to illuminate the excretions with light of two or more different wavelength ranges and to record corresponding images. Admittedly, it is true that most smartphone displays are not able to selectively emit light in a very narrow and highly precise wavelength range, as laser devices, for example, are able to do. However, by using a full screen display, e.g., of initially the rgb color value 255,0,0 for "red", then the rgb color value 0,255,0 for "green", and then the rgb color value 0,0,255 for "blue" on an LED display, a sequence of predefined illumination processes with different wavelengths is achieved. Depending on the embodiment, other wavelength ranges or color values may be used in the color space of the display.

The analysis software is preferably a machine learning software which was trained on a data set of training images of excretions of the animals, wherein at least some of the training images were selectively illuminated with light of only one wavelength or with light of one wavelength range, which may be generated by the light source. The training data set thereby preferably covers all of the wavelength ranges sequentially used by the illumination source or by the illumination function, i.e., the training data set includes a plurality of images of excretions which were illuminated using light of each of these defined wavelengths or wavelength ranges. The illumination function and the analysis function of the analysis software thus form a functional unit. This may be advantageous, since a large amount of spectral information of the excretions of the animals may be recorded using the simplest means (smartphone with camera, and a program that implements the illumination function), and the information may also be used by the trained machine learning algorithm to enable a precise analysis and prediction or output of the analysis results.

According to alternative embodiments, the lighting unit may, however, be a special lighting device, which is not a component of current, conventional smartphones. For example, the lighting unit may be a laser light source and/or be a light source in a wavelength range which is not visible (to humans), e.g., in the infrared range (e.g., 850-950 nm) or the UV light range (280-380 nm).

The physiological parameter may be, e.g., body temperature, measured metabolite concentration, body weight, feed consumption, water consumption per animal and time unit or per group of animals or barn per time unit, etc. The water consumption and/or feed consumption may be entered, e.g., manually via a GUI of the analysis software in some embodiments, and/or may be automatically obtained by the analysis software from corresponding sensors or meters of an animal watering or feeding systems.

Therefore, the method for keeping animals also represents in another aspect a method for computer-assisted monitoring of the heath of the kept animals and/or a method for early detection of a predicted drop in performance, caused, for example, by a disease. In another aspect, the method represents a method for computer-assisted detection of poor or improvable husbandry conditions, in particular of malnutrition or nutritional deficiencies, which may occur in animal husbandry.

According to embodiments, the method comprises recording the at least one image by an image capture unit, in particular a camera. The camera may be, for example, a portable camera, in particular a smartphone camera or a photographic apparatus. In particular, the camera may be the camera of a smartphone of a person working in the barn. This may be advantageous, since the vast majority of people own smartphones with integrated cameras, in developing and emerging countries as well, and are familiar with their operation. It is thus not necessary to install special sensors in the barns or enclosures, to regularly maintain them, and to train the personnel.

Alternatively, the image capture unit may, however, also be a camera that is permanently installed in the barn, enclosure, or other space, in which the animals are kept. According to another alternative embodiment, the image capture unit is a camera which is permanently installed on a mobile robot or a conveyor belt. The robot or the conveyor belt is designed and correspondingly positioned to move in an area, in which the animals are kept. For example, the camera may be installed at a suitable height and in a suitable angle, which ensures that images are recorded from the floor of the area, where feces are regularly located. Combinations of image capture units of different types may also be used. The use of robots and/or conveyor belts with a camera may be advantageous, since by this means manual recording of the photographs may be omitted and the recording conditions may be kept particularly constant. These embodiments are logical, in particular at a high level of automation of the fattening farm, and have the advantage that, for example, the recording angle remains constant. By this means, that the camera is mounted on a mobile unit, it is ensured that images may be analyzed from different areas of a barn or enclosure used for keeping animals, so that the database may be enlarged and the quality of the analysis results may be increased.

According to embodiments of the invention, the recording of the at least one image includes a positioning of a color reference object in the spatial vicinity of the excretions, which are recorded in the image. The color reference object has one or more different colors in defined areas of the color reference object. The analysis software is designed to use the colors of the color reference object during the analysis of the at least one image to normalize the colors of the excretions depicted in the at least one image. The at least one image also depicts the color reference object in addition to the excretions.

For example, the color reference object may be a paper or plastic strip, on which one or preferably multiple color points are applied at defined points known to the analysis software, wherein the color points have a defined color and/or brightness value. An employee, who records the excretions of the animals with his smartphone camera during his daily inspection round through the barn, holds the color reference object over or next to the feces during the recording, so that the recorded image depicts both the feces and also the color reference object. The color reference object and the analysis software are preferably provided by the same vendor and the analysis software is designed to normalize the colors, brightness and/or contrast values of the at least one received image based on the colors and/or contrast values of the color reference object.

This may be advantageous, since the normalization of the color values and/or brightness values of the received images by the analysis software based on the color reference object ensures that the analysis software will provide the same results, even if the light conditions may be different in different barns or different areas of the same barn or at different times of day. It is also possible, that different types of smartphones or smartphone cameras are used by different employees, and that certain variations in the brightness and/or color space of the images recorded with these cameras are caused due to this. A normalization of the colors and brightness's of the images based on the color reference object may also be advantageous, as by this means a robustness of the analysis results may be achieved with respect to different camera types and/or different light conditions during the recording. The use of a color reference object may be advantageous, since a high reproducibility of the recorded images and a high quality of the analysis results may be ensured with this very simple measure.

According to embodiments of the invention, the action, output by the analysis software, is an action which is to be carried out at a certain action point in time. The action point in time may be a current point in time or a future point in time starting from the point in time of the analysis. For example, the analysis software may output that the feed must be immediately changed in order to prevent deficiencies of certain mineral substances in the animals. It is also possible that the output of the analysis software includes that a certain measure, for example, changing the feed composition or administration of a certain medication must be carried out immediately or is only necessary at a certain point in time in the future, for example, only after two days starting from the point in time of the analysis. Whether the action point in time lies in the present or the future depends on which action it is, and how clearly the analysis software considers a certain action to be necessary in light of the excretions depicted in the received image. This may, in turn, depend on rules or the training data set, which were used to generate the analysis software.

For example, it may be advantageous in the case of unclear symptoms to not immediately carry out a particularly expensive treatment, or a treatment linked to disadvantages/side effects (for example, administration of an antibiotic); however, to output that an administration is recommended in 2-3 days. This gives the animal husbandrist the possibility to order the corresponding medication in a timely fashion, or also leaves the possibility open to omitting the administration of the medication, in case the analysis software, based on images of excretions from the subsequent day, comes to the conclusion that an antibiotic treatment may be omitted, because the disease had only affected a few animals and is understood to be in remission by itself.

Additionally or alternatively, the predicted manifestation of the performance indicator may be a manifestation, whose occurrence is predicted for a manifestation point in time. The manifestation point in time is a future point in time starting from the point in time of the analysis.

The analysis software is preferably designed to calculate the prediction of the manifestation of the performance indicator at the manifestation point in time and the recommended action at the action point in time, such that the action point in time has a sufficient time interval before the manifestation point in time, which allows the manifestation of the performance indicator to be influenced in a certain, desired way (positively or negatively) at the manifestation point in time by carrying out the recommended action at the action point in time. For example, the analysis software may be designed to already recognize the outbreak of certain diseases, for example, population-wide coccidiosis or clostridia infection, 2-3 days before the actual population-wide outbreak, and to predict it based on characteristics specific to these diseases, e.g., color characteristics of the blood, which is visible in the images of the excretions of some animals, which already have slight, disease-related changes. This time interval is generally sufficient to enable the operator of the animal barns to introduce countermeasures in a timely fashion. The countermeasures may include, for example, the administration of medications against coccidiosis and/or clostridia, the identification and separation of already infected animals, the administration of a particularly high-value or digestible feed, increasing the temperature or humidity, and the like.

According to embodiments of the invention, the recommended action contains one or more actions. These actions may be, for example, the following actions: providing a certain animal feed or drinking water, administration of one or more medical or non-medical substances to the animals in a physiologically effective form, in particular minerals, vitamins, medications (e.g., via food, drinking water, air, etc.); ending an ongoing administration of one or more medical or non-medical substances to the animals in a physiologically effective form; changing the physical parameters of an animal barn or area in which the animals are kept, in particular, humidity and temperature.

According to embodiments of the invention, an output of the predicted manifestation of the performance indicator to a user and/or the output of the recommended action to a user is carried out via a user interface of the analysis software. In particular, this user interface may be a graphic user interface, a so-called GUI.

Additionally or alternatively, the output of the recommended action is carried out to an electronic or mechanical system, which is operatively coupled to an animal barn or an area in which the animals are kept. The electronic or mechanical system is designed to carry out the action upon receiving the recommended action.

For example, this electronic or mechanical system may be the heating or ventilation system of the animal barn or an automated feeder or drinking water system. The suitable measures may preferably be automatically implemented to adapt physical parameters of the barn so that the performance and health of the animals is maintained and/or increased. For example, the drinking water supply or the feed supply may be increased in order to cover an increased need, or the feed supply may be reduced in case the animals suffer from acute loss of appetite. More minerals or vitamins may also be automatically added to the feed, e.g., as prophylactic or curative measures.

According to embodiments of the invention, the disease is coccidiosis, clostridia infection, salmonellosis, cryptosporidiosis, diseases caused by gastrointestinal parasites, such as in particular, gastric worms or intestinal worms or unicellular pathogens, colisepsis, lawsoniosis, or swine dysentery. However, the disease may also be any other disease which expresses itself in a characteristically changed image of the excretions of the animal. If necessary, a training data set in the form of training images of excretions from healthy animals and animals sickened by this disease must be generated for each of these other diseases, in order to train a machine learning algorithm in this training data set, in order to generate the analysis software, or corresponding rules for the respective diseases must be manually defined, on the basis of which the analysis software carries out the analysis.

According to embodiments of the invention, the animals are poultry, cows, sheep, or pigs.

According to embodiments of the invention, the analysis software is software based on predefined rules. This may be advantageous, since rules may be generated and interpreted by human beings. It is thus possible to allow human expert knowledge to flow into the software. However, rules-bases systems also have the disadvantage that the rules must be explicitly formulated. Predictive parameters, which are not known to the programmer, may thus not be integrated into the software.

According to embodiments, the analysis software is a trained machine learning software. This may be advantageous, since it is possible, by training the software on a sufficiently large data set, to obtain an analysis software which also recognizes the predictive features, which are not known to the human beings, thus, e.g., combinations of certain features of the images of the excretions, e.g., graininess, moisture, color of the depicted excretions, but also combinations of features of these images with measured values and/or metadata with respect to administered substance, and considers them in future analyses. Admittedly, the features and combinations of features learned by the machine learning software during the training process are generally not explicitly stored in a way that is interpretable by a human being. Therefore, the machine learning systems used may evaluate a large number of features and combinations of features with respect to their predictive power, and use combinations with high predictive power, which are often not known to human beings, for future analyses and predictions.

According to embodiments of the invention, the method further includes providing a training data set, which contains a plurality of training images of excretions from animals of the same type of animals as the animals which are kept. The training images are annotated with metadata (stored as linked). The metadata include at least one performance indicator of the animal(s) whose excretions are depicted in the training images. The metadata additionally include the composition of the feed or drinking water which was administered to these animals at the point in time of the recording of the training images. The method includes a generation of the analysis software by training a machine learning software using the training images.

For example, the predicted manifestation of the performance indicator may include a predicted extent and/or duration of the manifestation of the performance indicator, in particular the extent and/or duration of a disease symptom or a disease. The recommended action may include, e.g., a recommendation regarding the type and amount of medications, feed, feed additives, and/or drinking water additives, which should be administered to the animals in order to maintain or promote the health of the animals. The predicted manifestation of the performance indicator may also include a reference to possible causes of the predicted performance drop.

According to embodiments, the at least one image comprises a plurality of images. This may be advantageous, since the database is expanded and thus the quality of the analysis is increased. By recording multiple images at a certain point in time, for example, during an employee's routine daily inspection round through the barn, it is possible to evaluate recordings of excretions from a plurality of animals and preferably also from different areas of the barn or area, in which the animals are kept. By this means, the influence of so-called "outliers" may be reduced. In addition, the situation may occur that initially only very few animals in the animal population are infected by a contagious disease, and thus only the excretions from these few animals have changes. Because multiple images of excretions are recorded from multiple different animals at a certain point in time, the probability is increased that the analyzed images also comprise excretions from these few affected animals, so that countermeasures may be quickly implemented. In addition, it may be that different animals react in a different way or to a different extent to a certain pathogen or another environment parameter. Because multiple images are recorded, the analysis software may gain a better overview about the prevailing variance of different features of the excretions and by this means improve the quality of the analysis.

According to embodiments, the input of the at least one image and the analysis of the at least one input image is carried out regularly at a frequency of at least once per day. The respectively input images are digital images, which were currently recorded and depict current excretions from one or more of the animals. The analysis is carried out selectively on those received images which were recorded within a predefined time interval prior to the point in time of the analysis. For example, the analysis may relate not only to the currently recorded images, but also to all images which were recorded within a predefined time interval, for example, 5 days or 7 days or ten days, calculated from the current day, on which the additional images were recorded and analyzed by the analysis software. The evaluation of all images, which were recorded within a moving and relatively short time window of a few days up to weeks, may be advantageous, since by this means the database may be enlarged and the quality of the analysis results may be improved. The analysis of images, which were recorded over multiple days, facilitates the recognition of trends, thus, for example, a feed evaluation that has improved or worsened, feces changed by disease, the prevalence or increase of diarrheal diseases, etc. It was observed also that the exclusion of images, which were recorded prior to a certain time interval of, e.g., 5 days, 7 days, or 10 days, may improve the analysis results, since images of this or even greater age generally no longer possess any predictive force with regard to current or future performance indicators.

Optionally, the analysis software (or a part of this software designed as a client application) may be designed to store one or multiple reference images of excretions from animals of a certain barn linked to one or more metadata. The analysis software or the client application is further designed so that a user of the analysis application may prompt the analysis software to selectively output these reference images, e.g., via a smartphone display, while using a selection filter of one or more of these metadata. The metadata may be, e.g., the date for recording the image, an identifier of the barn or area in which an image was recorded, geodata about the location, at which the image was recorded, season, species, animal breed, type, origin, and/or amount of one or more currently administered substances or substance mixtures (feed, feed additives, medications).

The storage of reference images and the possibility of output of the reference images controlled by the metadata may be advantageous, since this provides the user with an additional possibility for checking the outputs of the analysis software for plausibility. If, for example, the analysis software does not recognize a disease, even though the currently photographed excretions look significantly different than the excretions that were recorded a few days ago at the same location, and although nothing has been changed in the feeding parameters, this is an indication that, despite the absence of a corresponding warning message, increased monitoring of the animals may be sensible as, for example, a disease may have broken out that is not covered by the analysis software, e.g. because the analysis software was only trained for *Salmonella*, coccidiosis and clostridia; however, a disease caused by worms is currently causing a change in the color of the excretions.

As already depicted above, for example, one or multiple employee(s), who carry out an inspection round through an animal barn or animal enclosure one to several times per day, also record multiple images of the excretions of multiple animals at different locations in the barn or enclosure with the aid of a conventional smartphone camera during this opportunity. The conventional work schedule, for example, the provision of feed, changing bedding, checking the drinking water systems, etc., is not substantially delayed by the recording of the images.

According to embodiments of the invention, the method comprises a provision of a feed or drinking water to the animals of the barn, wherein the feed or drinking water is admixed with an indicator substance, which causes a coloration in the excretions of the animals depending on the physiological conditions of the animals.

For example, the indicator substance may be a pH indicator. This may be advantageous, since the pH value of the feces may be used as an integrated indicator of a plurality of metabolic processes in the intestinal tract of the animals. It allows conclusions to be drawn about the metabolic performance of different groups of microorganisms in the intestine, since the stool pH value depends on the composition of the intestinal flora and thus indirectly on the feed administered, which is metabolized by the microorganisms. Carbohydrate compounds, especially fiber, are converted into short-chain fatty acids by some bacteria and thus cause acidification of the intestinal environment and feces. In contrast, protein-rich feed stimulates the proteolytically active intestinal bacteria, which form ammonia and other metabolic products with an alkalizing effect. In pigs with healthy intestinal tracts, the sum of these processes results, for example, in pH values between 6.0 and 7.0. Unbalanced diets, diseases, or other environmental factors may lead to a change in the composition or functioning of the intestinal flora and thus to a shift in the pH value of the excretions. Disorders in protein and/or fat digestion (exocrine pancreatic insufficiency, bile acid secretion disorder, etc.) and also inflammations with loss of plasma proteins may result in an increased transfer of these substances into the large intestine and alkalization of the feces. In contrast, a fiber-rich diet, but also a carbohydrate intolerance, is apparent in acidification of the stool.

The pH indicator may be, for example, betaine or another betacyanin with a pH-indicative effect, or an anthocyanin. The dye betaine is mainly found in beets (*Beta vulgaris*), but also in the flowers and fruits of other plants. Betain belongs to the betalain group and its betacyanin subgroup. Glucosidic betanin is a highly water-soluble dye, whose color depends on the pH in the aqueous solution: the solution is violet in a strongly acidic pH up to 2; at pH 4 the color changes to red. In the strongly basic range, the color changes to yellowish brown due to hydrolysis of the glucosidic bond. This creates an aglycone betanidin and glucose. Other pH indicators may also be used as feed additives or drinking water additives. Anthocyanins, e.g., cyanidin-3-triglucoside, give red cabbage a pH-dependent, red to blue color. A plurality of pH indicators are known from the prior art, e.g., litmus, bromothymol blue, phenolphthalein, or combinations of these substances. PH indicators are preferably used, which are inexpensive and chemically stable, which are not completely metabolized even when passing through the gastrointestinal tract, and which are physiologically acceptable.

The administration of feed or water with the indicator substance has the advantage that the recordings of the excretions contain, optionally, additional information about relevant physiological parameters, e.g. the pH value of the excretions, which enable a more exact prediction about the manifestation of a certain performance indicator. The pH value of the excretions is not recognizable from the digital pictures in and of themselves. By administering the indicator substance and using an analysis software, which has been adapted to the administration of the indicator substance (e.g., by means of training on a training data set with images of excretions from animals, to which the indicator substance was also administered), additional important information about the health status of the animals may be obtained, without complicating the process of data collection for ordinary employees.

According to one alternative embodiment, the indicator substance is not added to the feed or drinking water, but is applied to the excretions shortly before the at least one image of the excretions is recorded. This may have the advantage that a smaller amount of the indicator substance is consumed and also physiologically harmful substances may be used which are not suitable as food supplements. However, this makes the step of recording the image somewhat more time-consuming.

Analogously, the portion of undigested fats, fatty acids, certain carbohydrates, e.g., starches and/or the portion of certain amino acids, peptides, and proteins in the excretions may provide information about the health status of the animals and in particular about the presence of specific digestive problems. A variety of additional information may thus be obtained by adding appropriate indicator substances directed to the aforementioned substances, which cause a color change in the excretions depending on the content of fats, fatty acids, certain carbohydrates, amino acids, peptides, or proteins, as an alternative or in addition to the administration of the pH indicator. In this case, the analysis software preferably includes a GUI, which allows the user to enter the one or more administered indicator substances as metadata into the analysis software, so that this information is taken into account when carrying out the analysis and is incorporated into the analysis result.

According to another embodiment, the indicator substance is a fluorescent dye or a substance which is coupled to a fluorescent dye. The chemical resistance and/or the excretion rate of the indicator substance preferably depends on physiological parameters of the intestinal tract of the animals, e.g. the presence of inflammation or parasites in the gastrointestinal tract, the pH value, intestinal flora, and other factors. The image capture unit, which is used for recording the at least one image, is preferably coupled to a light source which emits light at a wavelength which may excite the fluorescent dye to fluoresce and to emit fluorescent light. Optionally, the at least one image may be recorded using a color reference object which contains a color point with a defined amount of this fluorescent dye.

For example, unlike many other organic acids, gluconic acid is only resorbed to 30% in the small intestine of most mammals. The majority of this substance is metabolized by various intestinal bacteria to acetic and lactic acids, which are then further metabolized to health-promoting short-chain fatty acids such as butyric acid and propionic acid. The concentration of several other organic acids and their metabolism also depend on the physiological conditions in the gastrointestinal tract, so that the concentration of these metabolic products in the excretions may provide information about possible diseases. However, the detection and quantification of individual chemical substances is, in many cases, too complex. According to embodiments, an indicator substance is administered to the animals, which is coupled to a fluorescent dye or which itself has fluorescent properties and whose concentration in the excretions of the animals depends on the physiological conditions in the gastrointestinal tract. German patent DE69726135T2, for example, discloses fluorescent complexes of tri- and tetra-cyclopolyazamacrocyclic compounds, which are suitable for biological applications since they are stable in aqueous media and are non-toxic.

Chelating agents based on tetra-azamacrocyclic structures are particularly suitable for generating aqueous barn lanthanide chelates. Amino carboxylate and aminophosphonate chelating agents, which are derived from 1,4,7,10-tetraazacyclododecane, form highly stable lanthanide chelates, which have proven to be particularly suitable as feed or drinking water additives, since their concentration in the excretions is at least a rough quantification, and conclusions on animal health may thus be drawn in the course of the analysis of the images of the excretions, excited to fluorescence using a suitable light source. In contrast to conventional fluorescence immunoassay methods, the method is very easy to use. However, even though a rough quantification is also carried out here on the basis of the fluorescence signal, the analysis is not based on complicated immunological assays, but instead on the administration of a fluorescing indicator substance with the feed or drinking water and an automated evaluation of corresponding fluorescence images of the excretions.

Suitable lanthanides include e.g. terbium (Tb) and europium (Eu), which are used, coupled to a small molecule, without this necessarily being an antibody. This molecule is, for example, a bi-functional chelating agent, as described in patent DE69726135T2, and which are covalently bound to biologically active substances, in particular to substances which are typically metabolized in the gastrointestinal tract, such as, e.g., dextran, and pharmaceutically acceptable salts of the same. "Pharmaceutically acceptable salts" as used herein means any salt or mixture of salts which is sufficiently non-toxic to be useful for diagnosing animals, preferably mammals. The biologically active substances may be, in particular, organic substances, e.g., acetic acid, succinic acid, citric acid, lactic acid, maleic acid, fumaric acid, palmitic acid, cholic acid, palmonic acid, mucic acid, glutamic acid, gluconic acid, d-camphoric acid, glutaric acid, glycolic acid, phthalic acid, tartaric acid, formic acid, lauric acid, stearic acid, salicylic acid, methanesulfonic acid, benzenesulfonic acid, sorbic acid, picric acid, benzoic acid, cinnamic acids, and other suitable acids.

In order to reduce costs, the fluorescent indicator substances may also be administered to only a few selected animals for a short time, for example in order to gain an even more precise picture of a possibly existing health problem. For example, the indicator substance may be administered in a range of 0.01-1 mmol/kg body weight of the animal; however, the recommended dose depends on the substance and the animal species. In general, enough of the indicator substance should be administered so that there is still a clearly measurable amount of the indicator substance in the excretions of a healthy animal, so that upward or downward concentration deviations, which may indicate a health problem, may be clearly measured and recorded by the image capture unit.

This may be advantageous, since the intensity of the fluorescence signal of the excretions may provide information about how strongly the indicator substance has been chemically broken down or absorbed during the passage through the intestine. The amount of fluorescent dye per area in the color point of the color reference object preferably corresponds to the amount of fluorescent dye which is to be expected in an identical area of the animal excretions in healthy animals. Deviations in the intensity of the fluorescence signal provide information about various physiological conditions in the gastrointestinal tract of the animals.

Depending on the application, the indicator substance may be added in response to a predicted manifestation of a performance indicator, for example, when the analysis software already predicts the occurrence of diseases of the gastrointestinal tract for the next 2-3 days, and the addition of the indicator substance should ensure that additional information regarding the digestive tract is obtained. However, it is also possible to administer the indicator substance prophylactically. For example, the analysis software may be designed to predict the presence of the disease based on recordings of excretions from animals which have ingested the indicator substance with the feed or the drinking water.

According to embodiments, the analysis software was trained on a training data set which comprises images, that come from excretions of animals (with different performance parameters, healthy and sick animals), which have ingested the indicator substance with the feed or the drinking water, or to which the indicator substance was added directly after the excretions left the animal's body. The latter may be carried out, e.g., by nebulizing or trickling the indicator substance onto the excretions. The analysis software is designed to automatically recognize the current or future presence of a disease and/or other performance indicators related to the animals based on optical properties of the excretions, in particular their color, wherein the optical properties of the excretions depend both on the presence of the disease and/or the performance of the animal as well as on the administration and concentration of the indicator substance. The kept animals are, in particular, animals that are kept together, e.g. in the same animal barn or the same enclosure.

According to embodiments of the invention, a feed or drinking water, which is admixed with an indicator substance, is provided or administered to the animals before the recording of the at least one image, wherein the indicator substance is a substance which causes a coloration in the excretions of the animals depending on the physiological state of the animals, in particular, the infection of the animals with pathogens. The indicator substance may be, in particular, a pH indicator.

According to embodiments, the analysis software is designed to receive digital images of all or several of the animals at regular time intervals, in addition to the digital images of excretions. The images are provided with a time stamp and are preferably received at a frequency of at least once every 10 seconds, preferably at least once every 5 seconds, further preferably at least once per second. These images are preferably received from one or more stationary cameras of the animal barn or the area where the animals are kept. The analysis software carries out an image analysis of the images with the time stamps in order to recognize individual animals as objects and to calculate a movement profile for the animals over time. The mobility of the herd is an indication of the health status of the animals. A herd that is calm but mobile is healthy. A higher movement frequency may indicate certain diseases, or temperatures that are too low: a reduced movement frequency may also indicate diseases, e.g., viral infections, or the temperature in the barn is too high. The movement profiles may be used supplementally to refine the analysis which is substantially based on the analysis of the excretion images.

According to embodiments, the analysis software includes access to a database with data about inventories, belonging to a keeper of the animals, of different substances or substance mixtures, in particular feed compositions, feed additives, drinking water additives, vitamins, minerals, and veterinary medical preparations. The database may contain further data, e.g., actually measured performance indicators of animals in the animal barn or animal enclosure, to which pictures of their excretions, which were recorded in chronological proximity to the measurement of this performance indicator, are also assigned. The measured performance indicators may be, e.g., images of the gastrointestinal tract of slaughtered animals, images of the excretions of these animals having been recorded a few hours or days before their slaughter, said images are preferably likewise stored in the database and may be used for generating or improving the analysis software by training or retraining a machine Learning algorithm.

The analysis software checks automatically whether the inventories are exhausted, with respect to the substance or substance mixture, following the removal of a quantity and type of a substance or substance mixture which is removed according to the recommended action. The analysis software then automatically transmits via a network an order message to an electronic ordering system of a vendor of the removed substance or substance mixture.

For example, the database may be the database of a goods management software, to which an automatic ordering software is connected. When the operator of the animal barn removes a certain substance, for example a sack of feed, a package of a feed additive, or a veterinary medicinal preparation from the inventory, the removal is automatically or manually entered into the goods management software so that it is ensured that the stock of goods held in the inventory is always currently updated. In some embodiments, the goods management software is operatively coupled to consumption sensors of machines and devices which directly or indirectly indicate the consumption of a substance. For example, the consumption sensors may be consumption sensors of feeding machines or water meters of drinking water systems.

The automatic reordering may thus simplify animal husbandry and accelerate processes linked to this, since the analysis software, in conjunction with the goods management software, automatically ensures that the inventory of required substances is automatically maintained or supplemented.

According to embodiments, the method comprises manual or automated input of at least one measured value into the analysis software. The at least one measured value may comprise, for example, one of the following measured values or a combination of two or more of these measured values: temperature of the milk secreted by the animals; electrical conductivity of the milk secreted by the animals; temperature of the barn; ammonia content in the [term missing]; humidity in the air, the distance of the sensors from the ground is thereby preferably less than 20 cm, preferably less than 10 cm; amount of feed dispensed per animal or per barn per time unit in the last measured time unit; amount of drinking water dispensed per animal or per barn per time unit in the last measured time unit. The analysis software then also performs an analysis of the at least one measured value, in addition to the analysis of at least one image. The recommended action and/or the predicted manifestation of the performance indicator depends on the result of the analysis of the at least one image and on a result of the analysis of the at least one measured value. The stated measured value parameters have the advantage that they are filed and collected daily in any case by sensors for the barn management software in many animal barns in order to control the ventilation and other technical equipment in the barn, and are therefore already available, comparatively easy to record, and are robust against environmental influences.

All these parameters are preferably measured in chronological proximity to the time of the recording of the at least one digital image, thus, for example, within the same hour or within a time interval of 6 hours or within the same day. If the system of the animal barn or area where the animals are kept already has corresponding sensors, then the stated measured values may also be supplementally taken into account in the prediction of the performance indicator and/or in the calculation of the recommended action by the analysis software. In general, however, the images of the excretions alone are sufficient to obtain an accurate analysis result, so that the method is suitable, in particular for keeping animals under technically simple conditions, i.e. without the use of additional sensors or without taking into account the corresponding additional measured values. The analysis software is preferably a machine learning software, in the training of which only some of the training images, but not all of them, were annotated with supplemental measured values, for example, milk temperature, floor temperature, etc. A sufficiently large part of the training data set comprises digital images of excretions from animals, about which a current or future performance indicator, or a currently or future recommended action was known and stored as linked with the respective images; however, no measured values were linked thereto. By this means, it is ensured that, even in the absence of the stated measured values as supplementary metadata, an accurate analysis and output the analysis results may be carried out by the analysis software.

Optionally, additional data may be received, for example, data that the user has entered via a GUI of the analysis software, e.g., the species and strain of the animals, age of the animals, sex of the animals, composition of the feed (optionally coded in the form of a feed type ID), etc. These other data are likewise included in the prediction. The prediction is then carried out as a function of the images received, of the additional data ("metadata"), in particular, feed, feed additives, medications, etc. and the measured values, if these have been received.

According to embodiments, the analysis software is implemented as a software application, which is instantiated on a mobile computer system, in particular a smartphone. The analysis software is designed to receive the at least one image of the excretions from a camera of the mobile computer system and, optionally, to receive metadata (e.g., currently administered substances, like feed, feed additives and medications) and/or measurement data. The analysis software is designed to carry out the analysis of the at least one image and to output the recommended action and/or the predicted form of the performance indicator. The analysis software may have, e.g., a GUI which is shown to the user of the mobile computer system via a display of this computer system, and which allows the user to enter the metadata and/or the measured values into the analysis software via the GUI. Alternatively, the analysis software may also include a local interface to one or more sensors, e.g. thermometers, e.g. a Bluetooth interface, or be connected to the sensors by means of a network, e.g., the internet, so that, according to some embodiments, the analysis software may receive measurement values from these sensors. This embodiment variant may be advantageous, since both the recording and the analysis of the images may be carried out using local means, all of which are available on the smartphone of the user. For example, the analysis software may be installed on the smartphone in the form of an app. The user is therefore independent of other remote computer systems, which may be particularly advantageous in areas or buildings with an unstable connection or lacking a mobile phone connection or lacking a WLAN connection.

According to one alternative embodiment, the analysis software is designed as a distributed client-server software application. The client software is instantiated on a mobile computer system, in particular on a smartphone, and is designed to receive the at least one image of the excretions from a camera of the mobile computer system and to transmit it to a server application that is instantiated on a server computer system. The server application is designed to receive the at least one image from the client application, to carry out the analysis of the at least one image to calculate the recommended action and/or the predicted manifestation of the performance indicator and to transmit the recommended action and/or the predicted manifestation to the client application via the network. The client application is designed to output the recommended action and/or the predicted manifestation to the user of the mobile computer system.

According to other embodiments, the analysis software is designed as a distributed client-server software application. The analysis software thus comprises a server application and a client application, which are interoperable with one another via a network. The client application may be installed and/or instantiated on one or more client computers, wherein the client computers are preferably each designed as mobile computers, e.g. smartphones or tablet computers. The server application may be connected to a plurality of client applications via a network. Each of the client applications is hereby operatively coupled to an image capture unit, e.g. the camera of the smartphone on which the client application is respectively installed. Each of the image capture units may be located at least at the point in time of the image recording within one of a plurality of different animal barns or areas where animals are kept. The server application is designed to carry out the following method: receipt of at least one digital image by the server application from each of the client applications via the network. The at least one received image shows excretions of one or more of the animals of an animal barn or area where the animals are kept.

Based on the received at least one image, the server application is designed to carry out an analysis of this image, and to transmit the result of the analysis, thus a recommended action and/or a predicted manifestation of a performance indicator to the client application. The transmission may be carried out via the network. For example, the result of the analysis may be transmitted to the client application, from which the at least one image was received, and the client application may be designed to display the result, received from the server application to the user of the corresponding client computer via a display. Additionally or alternatively, the output may also be carried out on a mechanical or electronic system which is operatively connected to an animal barn, in order to cause the latter to change an environmental or feed parameter. This system may be, e.g., a heating system, an air conditioning system, a drinking water system, an automatic feeder for an animal barn or the like. Optionally, the client application may also be designed to receive measured values from sensors and/or to receive metadata, which a user inputs manually via a GUI of the client application, and to forward the measurement data and/or metadata to the server application. The forwarded measurement data and/or metadata are then an additional basis for the analysis by the server application.

This may be advantageous, since the server-side implementation of the analysis functionality may access the image data, as well as optionally also measurement data and metadata, including real observed performance indicators of a plurality of client applications, and thus typically also of a plurality of different animal barns or animal populations, and may centrally store and evaluate the same. This enables continuous improvement of the analysis functionality by repeated training on a constantly growing data set. It enables the automatic recognition of false predictions and recommendations, based on the centrally collected data and improvement of the algorithm, whether by explicitly changing explicit rules, in the case of rule-based analysis programs, or by repeatedly training a machine learning program on a constantly growing training data set. In addition, it is thus also possible to provide a lean client application, i.e., one that requires little memory and computing capacity. Its function is preferably limited to forwarding the images recorded by the smartphone camera of the client computer to the server application, the optional provision of a GUI which allows the user to enter metadata, like the feed currently being fed, and the receipt of the analysis results from the server application, wherein the analysis results are preferably displayed to the user of the client computer by the client application via a GUI.

According to embodiments, the analysis software (or in the case of a client-server architecture, in particular the server application) is designed to receive at least one manifestation of a performance indicator of the animals in the animal barn, and optionally further animal barns, which is either measured or entered by a user via a GUI. For example, the manifestation may be entered by the respective users of one or more client applications, the users being each responsible for different animal barns or animal populations, via the GUI of the respective client application, and transmitted to the server application. Supplementally or alternatively, the manifestation may also be entered via a GUI from one or more feedback applications into the respective feedback application, and transmitted from there to the server application via the network. Each of the feedback applications is thereby assigned to a slaughterhouse and is used, for example, to record and forward images of the slaughtered animals. The manifestation of the performance indicator may be, in particular, images of the gastrointestinal tract after the animals have been slaughtered. The manifestation of the performance indicator preferably relates to a point in time in chronological proximity to the recording point in time of the at least one digital image. For example, the performance indicator was measured on the day of slaughter, e.g. in the form of images of the gastrointestinal tract of the slaughtered animals, and the images of the excretions were recorded on the same day or the day before the slaughter. Chronological proximity thus means here preferably within 48 hours, preferably within 24 hours. These images may be correspondingly annotated by a veterinarian, e.g. "small intestine of a broiler chicken with acute coccidiosis", "healthy small intestine of a broiler chicken", "healthy small intestine of a turkey", "large intestine of a pig with acute diarrhea", etc.

The method comprises training a machine learning algorithm to automatically provide the analysis software (or the part of the analysis software designed as a server application), or to automatically provide an improved version of the analysis software (or an improved version of the part of the analysis software designed as a server application), wherein the training comprises an analysis of a received combination of a digital image of the excretions and the measured manifestation of the performance indicator.

This may be advantageous, since, with an increasing number of images in the database and an increasing number of client applications (which often correspond to different animal barns or fattening farms), the training data set grows and a continuous improvement of the analysis software is enabled by the retraining.

According to other embodiments, the analysis software is likewise designed as a distributed client-server software application. The server application is connected to a plurality of client applications via a network, wherein each of the client applications is operatively connected to an image capture unit. Each image capture unit may be located, at least during the recording of the images of excretions, within one of a plurality of different animal barns or areas where animals are kept. The server application is designed to carry out the following method for each of the animal barns: receipt of a message, which specifies at least one substance or substance mixture, which is presently administered to the animals of the animal barn; receipt by the server application from the client application of at least one manifestation of a performance indicator, measured or entered by a user via a GUI (of the client application or the feedback application of a slaughterhouse), of the animals of the animal barn, wherein the manifestation of the performance indicator relates to a point in time in chronological proximity to the point in time of the administration of the substance or substance mixture; and carrying out a first cluster analysis of the combinations of administered substances or substance mixtures received from each animal barn, and the received manifestations of the performance indicator for calculating clusters of animal barns with the same or a similarly administered substance or substance mixture, wherein an average manifestation of the performance indicator of all animals of each cluster is stored, linked by the server application to the respective cluster. The average manifestation may be, for example, a median, the arithmetic mean, or a value that is otherwise calculated from a plurality of manifestations of a performance indicator.

Additionally or alternatively, the server application carries out a second cluster analysis of the combinations of administered substances or substance mixtures received from each animal barn and the received manifestations of the performance indicator. The second cluster analysis functions for calculating clusters of animal barns, whose animals have the same or similar manifestations of the performance indicator, wherein the substance or substance mixture, which is administered in the plurality of animal barns in a cluster to the animals of this animal barn, is stored, linked to the respective cluster. Clusters of animal barns of similar performance levels are thus formed. By analyzing the feed administered in the majority of animal barn clusters, differences with respect to the effectiveness and quality of the feed or feed additive or of the veterinary medicinal preparation may be determined. According to embodiments, the analysis software carries out the second cluster analysis such that the animal breed and/or the manufacturer of the feed or feed additive is/are assigned to the formed clusters. This may be advantageous, since different manifestations of performance and general health, caused by different commercial food from different manufacturers, may be derived from the results of the cluster analysis. Different-performing animal breeds or particularly favorable or unfavorable combinations of animal breed and the respectively administered feed or feed additive may also be identified using the second cluster analysis.

The results of the first and/or second cluster analysis are finally transmitted from the server application to at least one of the client applications to output the cluster analysis results to a user.

The cluster analyzes depicted above may be advantageous, since without any additional effort worth mentioning, the effectiveness of certain feed additives and/or veterinary medical products may be checked and quantified in practice for the first time based on large numbers of objective and empirical data collected in commercial animal barns and under commercial husbandry conditions. Corresponding tests are currently often tested in the course of an approval process or product development project. However, the number of animals and animal barns tested is often limited and is tested at the hygienic and technical level of universities and research institutions and may not cover the wide range of different parameters that otherwise may be relevant in practice. Embodiments of the invention, in particular a distributed client-server system comprising several client applications, which are used in different animal populations, and which additionally collect and analyze performance indicators actually measured in at least one slaughterhouse and/or use performance indicators to improve the analysis software, may, in contrast, recognize and take advantage of the effectiveness of certain substances with regard to the performance and health of the animals in large numbers and under the real conditions of an animal fattening farm, without special efforts on the part of animal fattening farms.

The results of the cluster analysis may include suggestions for improving the performance parameters, in particular recommendations for medications for predicted diseases and disease symptoms, recommendations for feed or for changing the feed/feed additives, etc. If the cluster analysis yields, for example, that the 15 operations with the highest manifestations of a performance indicator (e.g. weight gain per time) administer a feed with feed additive A or a feed from a specific manufacturer, while 11 operations with the lowest manifestation of this performance indicator administer another feed additive B or one from another feed manufacturer, the feeds being largely identical in composition and other parameters, then the server application might be designed, e.g., trained to selectively transmit an output of the analysis result in the form of a recommendation message to the client applications which belong to the 11 companies with the poor performance values. The recommendation message may include a recommendation to switch to feed additive A or to the better feed manufacturer.

In another aspect, the invention relates to a storage medium on which computer-readable instructions are stored in the form of analysis software. The analysis software is designed to carry out a method comprising: input of at least one image into an analysis software, wherein the at least one image is a digital image which shows excretions of one or more of the animals; carrying out an analysis of the at least one image by the analysis software; output by the analysis software of a recommended action which is suitable for maintaining or improving the current physiological state of the animals, wherein the recommended action depends on a result of the analysis of the at least one image; and/or output of a predicted manifestation of a performance indicator of one or more of the animals by the analysis software, wherein the performance indicator is a physiological parameter, a disease symptom or a disease, wherein the predicted manifestation depends on a result of the analysis of the at least one image.

The storage medium may be a volatile or a non-volatile storage medium. The storage medium may be, in particular, an electronic storage medium which stores information in or on the basis of electronic (semiconductor) components. Various mechanisms are used in order to physically store the information, e.g., in the case of volatile memory, DRAM, dynamic RAM (dynamic random access memory) or SRAM (static random access memory), and in the case of non-volatile memory: ROM (read only memory), PROM (programmable read only memory), EPROM (erasable programmable read only memory), EEPROM (electrically erasable programmable read only memory), flash EEPROM (e.g. USB memory sticks) and others. Technical aids are also required in order to read electronic storage media. The end user therefore usually receives the electronic storage media not as a single storage module, but instead as a combined product: in the case of DRAM for use as the working memory in computers or peripheral devices, several storage components are combined on one storage module. The flash storage devices, popular for storing multimedia data in mobile applications, come in a variety of housings, usually designed as a memory card or USB memory stick, which also contain controllers in addition to the actual storage component. The same applies to solid-state drives, which also use flash storage devices but are supplied in a different device design with different interfaces. A storage medium in this case also comprises an association of several storage media, which are connected to each other via a network.

In another aspect, the invention relates to an electronic system for keeping animals. The system comprises a distributed or non-distributed computer system which is coupled to an animal barn image capture unit. The computer system includes analysis software and a database. The animal barn image capture unit is designed to record at least one image which depicts excretions from one or more of the animals. The analysis software is designed to carry out a method comprising: storing of the at least one recorded image in the database; input of the at least one recorded image into the analysis software; carrying out an analysis of the at least one image; output by the analysis software of a recommended action which is suitable for maintaining or improving the current physiological state of the animals, wherein the recommended action depends on a result of the analysis of the at least one image; and/or output of a predicted manifestation of a performance indicator of one or more of the animals by the analysis software, wherein the performance indicator is a physiological parameter, a disease symptom or a disease, wherein the predicted manifestation depends on a result of the analysis of the at least one image. Optionally, the distributed or non-distributed system may also include one or more sensors which are installed in an animal barn or area in which the animals are kept. The sensors are designed to record measured values and transmit them to the analysis software.

According to embodiments, the computer system is a distributed computer system consisting of a server computer and one or more client computers. The analysis software is designed as a distributed client-server software application, wherein a server application is installed and/or instantiated on the server computer system and a client application is installed and/or instantiated on each of the one or more client computers. The distributed computer system further comprises a slaughterhouse computer system which is operated by a slaughterhouse and which is coupled to a slaughterhouse image capture unit. The slaughterhouse computer system includes a feedback application. The slaughterhouse image capture unit is designed to record images which depict the gastrointestinal tract of one or more of the animals after their slaughter and to provide them to the feedback application.

The feedback application is designed to transmit the recorded gastrointestinal tract images to the server application via a network for storing the gastrointestinal tract images in the database of the server application. The server application is designed to carry out a method comprising: receipt from the at least one client application of at least one digital images of excretions from one or more of the animals, and storage of these images in the database; receipt from the client application of from the feedback application of at least one manifestation of a performance indicator, measured or entered by a user via a GUI (of the client application or the feedback application), of the animals whose excretions are depicted in the at least one received image, wherein the manifestation of the performance indicator is, in particular, images of the gastrointestinal tract after the slaughter of the animals. The manifestation of the performance indicator preferably relates to a point in time in chronological proximity to the point in time for recording the at least one digital image of the excretions; training a machine learning algorithm to automatically provide an improved version of the analysis software or an improved version of the server application, wherein the training comprises an analysis of the received combinations of digital images of the excretions and the received manifestations of the performance indicator. Excretion images and manifestations of the performance indicator, which relate to the same animals or to at least animals from the same animal barn are combined, that means, assigned to one another.

In another aspect, the invention relates to a mobile robot, which is designed in particular to keep and/or monitor animals. The robot includes a motor unit, which is designed for autonomous or semi-autonomous movement of the robot within an animal barn or area in which the animals are kept. The mobile unit may, e.g., consist of one or more wheels or tracks.

The robot includes an image capture unit, which is designed and aligned so that it records at least one image of the excretions of one or more of the animals. For example, the robot may move according to a dynamically calculated or predefined and stored movement path within the animal barn or enclosure, wherein the image capture unit is directed at the ground and records a digital image of the floor of the animal barn or enclosure at regular intervals, for example every 30 seconds. The robot also comprises a network interface, e.g., an interface for data exchange via the Internet, and an image capture unit, e.g., a camera. The robot includes one or more processors and a storage medium on which robot software is stored. The robot software may be, in particular, an analysis software or a client application which is part of an analysis software with a server-client architecture.

The robot software is designed to carry out, alone or in interoperation with a server connected via a network (and a server application instantiated on this), a method comprising: recording of at least one image by the image capture unit, wherein the at least one image is a digital image which depicts excretions of one or more of the animals; input of the digital image into the robot software; carrying out an analysis of the received image by the robot software; output by the robot software of a recommended action which is suitable for maintaining or improving the current physiological state of the animals, wherein the recommended action depends on a result of the analysis of the at least one image; and/or output of a predicted manifestation of a performance indicator of one or more of the animals by the robot software, wherein the performance indicator is a physiological parameter, a disease symptom or a disease, wherein the predicted manifestation depends on a result of the analysis of the at least one image. The output to a user of the recommended action and/or the predicted manifestation is carried out via a display device of the mobile robot or via a data processing device connected to the robot via a network, e.g., via a display of a smartphone of a user who has registered their smartphone with the robot software.

In another aspect, the invention relates to a combination of a feed additive with an indicator substance and a distributed or non-distributed storage medium with an analysis software, as this is described for embodiments of the invention. The indicator substance is a substance which causes a coloration in the excretions of the animals depending on physiological conditions in the metabolism of the animal. The analysis software is designed to predict the manifestation of the performance indicator and/or to calculate the recommended action on the basis of optical features of the excretions of animals, which received the indicator substance with the food or drinking water before the recording of the at least one image.

In view of the wide variety of permutations to the embodiments described herein, this detailed description is intended to be illustrative only, and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

The accompanying drawings, which are incorporated in and constitute a part of this specification, illustrate several embodiments of the disclosure and together with the description, serve to explain the principles of the disclosure.

DETAILED DESCRIPTION

Figure 1:
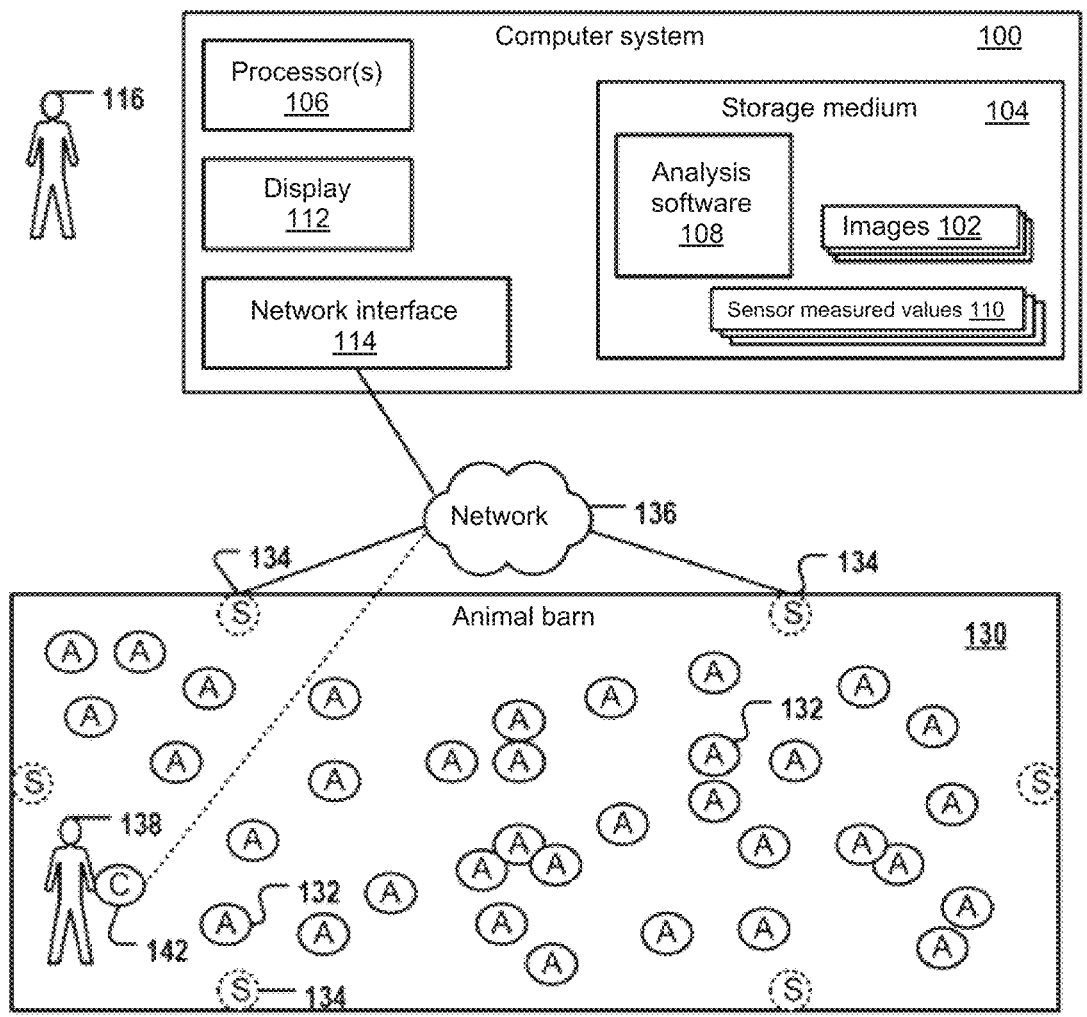
FIG. 1 schematically illustrates a computer system with an analysis software for monitoring the health of animals of an animal barn.

The present disclosure provides improved systems and methods for keeping animals The embodiments and examples described herein are to be understood as illustrative examples of the invention. Further embodiments of the invention are envisaged. Although the invention has been described by way of example to a specific combination of features, it is to be understood that any feature described in relation to any one embodiment may be used alone, or in combination with other features described, and may also be used in combination with one or more features of any other of the embodiments, or any combination of any other of the embodiments as long as these features are not mutually exclusive.

Like-numbered elements in these figures either are equivalent elements or perform the same function. Elements that have been discussed previously will not necessarily be discussed in later figures if the function is equivalent.

The subsequent descriptions relate to photographs from a poultry fattening farm, as they are used as examples for an input image for the analysis software according to the embodiments of the invention described here. Optionally, further information, in particular analog and digital measurement values and metadata from the barn technology (feeding, drinking water supply, ventilation, harmful gas detection) may be used as automatic and/or manual inputs for the analysis software. According to embodiments of the invention, the analysis software is preferably designed to predict the manifestation of one or more performance indicators. These performance indicators of an analysis software which is used to monitor poultry houses or husbandry systems include, in particular, essential diseases like clostridiosis, coccidiosis, swine dysentery and salmonellosis. Depending on the animal species to be monitored by the analysis software, the selection of the performance indicators taken into account by the analysis software may be different and, depending on the implementation variant, may depend on the defined rules or the training data set on which the analysis software is based. Analysis software for monitoring pigs, calves, piglets, cows, and beef cattle include, e.g., pigs/calves—salmonellosis, pigs—Lawsonia's disease, calves—cryptosporidiosis, and others. According to some embodiments of the analysis software, it is also conceived of for universal use in barns and enclosure systems for both poultry and mammals and covers a correspondingly wide range of performance indicators. The following photographs show excretions from broiler chickens and turkeys; however, the analysis software may also be designed (trained or explicitly programmed) in an analogous way so that it processes corresponding images of excretions from calves, piglets, and/or pigs in an analogous way, without these embodiments being explicitly depicted and explained in the following.

A "camera" is understood here to mean a photographic apparatus which may record static or moving images on a photographic film or electronically on a magnetic video tape or digital storage medium or transmit them via an interface. An analog photographic apparatus may be a camera; however, a smartphone camera is preferred. The image capture unit or camera may furthermore be connected to light-emitting sources as these are already present in a commercially available smartphone (flash unit and/or smartphone display) or special lighting units, which are, optionally, available commercially as additional devices, e.g., lasers with defined wavelengths, IR light sources, and/or UV light sources. The analysis software or a part of the same designed as a client application preferably includes an illumination function, which is designed to sequentially illuminate the excretions with light of two or more different wavelength ranges in a defined way. If a fluorescent indicator substance was administered to the animals, the light source may be designed, in particular, to emit light in a wavelength which excites the fluorescent dye to fluoresce.

"Analysis software" is understood here to mean software, which may be stored, distributed over a plurality of storage locations or in a single storage location, and which is designed to carry out an analysis of at least one or more digital images, and optionally further data, in order to calculate one or more analysis results.

A "computer system" is understood here to mean the entirety of the hardware and software components of a data processing system. The hardware and software components may thereby be in the form of a monolithic computer system ("standalone" computer system, e.g., a desktop computer, smartphone, notebook, server computer) or in the form of a distributed computer system (cloud computer system, distributed computer system with a server computer system and one or more client computer systems).

A "performance indicator" is a parameter, which is assigned to an animal or an animal population and which contains information regarding the performance, e.g., health, of this animal or animal population. A performance indicator may be, e.g., a physiological parameter (e.g., weight, growth rate, hemoglobin content in the blood), a disease symptom (e.g., bloody diarrhea, watery diarrhea), or a disease (e.g., coccidiosis, clostridiosis).

A "color reference object" is an object of any shape which contains one or more predefined areas with different colorations and/or textures assigned to the areas. The size of the object is preferably designed in such a way that the object is not substantially larger than the excretions of the animals, so that an image of the excretions may be easily produced with a cell phone camera, which also depicts a color reference object positioned in close spatial vicinity to the excretions. The color reference object may be, e.g., substantially two-dimensional and have a length of 0.5 to 10 cm and a width of 0.3 to 5 cm.

A "GUI" is a "graphical user interface".

A "sensor" is a technical component that may qualitatively or quantitatively record certain physical or chemical properties (physical, e.g. heat quantity, temperature, humidity, pressure, sound field sizes, brightness, acceleration, or chemical, e.g. pH value, ionic strength, electrochemical potential) and/or the constituent material of its environment. These variables are recorded by means of physical or chemical effects and converted into a further processable electrical signal.

"Excretions" are understood here to mean solid, liquid, or viscous excrements from animals, in particular, solid, liquid, or viscous feces.

A "predefined rules-based software" is understood here to mean knowledge-based software, which is designed to carry out rule-based conclusions. Rule-based software contains a number of rules (also called the rule repository) and a rule interpreter (also called an inference machine or a rule engine). The rules are in the form: IF . . . THEN . . . ELSE (IF THEN ELSE).

According to one embodiment, a rule-based analysis software may process a received digital image which depicts animal excretions, for example as follows, and then apply rules to the processed image: first, the digital image received as an rgb image is split into three separate, monochromatic images, which are subsequently called the R, G, and B images, wherein the R image selectively contains the intensity values of the red image channel, the G image selectively contains the intensity values of the green image channel, and B selectively contains the intensity values of the blue image channel. In a next step, the intensity values of the three images are respectively normalized. For this purpose, for example, the maximum intensity values measured in the respective images, which typically lie in a range from 0 to 255, may be mapped onto another standardized intensity scale of a predefined size, for example 0 to 100. The normalization may, alternatively or additionally, also be carried out on the basis of the colors which are contained in a color reference object which is depicted on the received rgb image. For example, the color reference object may contain a red spot, and the color-specific intensity normalization may be carried out such that the highest pixel intensity measured in the R image corresponds to the pixel intensity of this red spot. The color normalization may also be carried out by analysis software variants which do not function based on rules, thus, e.g., by analysis software variants which are based on a machine learning approach. In the next step, one or more rules may then be applied to the normalized R, G, B images: IF the average intensity, calculated for all pixels of a normalized image, exceeds a minimum value of 50 for at least the G image or the B image AND the corresponding average value of the R image lies below 20 THEN exclude "bloody diarrhea in the rectum" as a candidate for a manifested performance indicator. In other words, this rule contains, that images which have a certain minimum overall brightness selectively in the green and/or blue light spectrum, but not in the red spectrum, may not be considered as an indication for bloody diarrhea in the rectum, as this would be associated with a red coloration the stool. The evaluation of the brightness values of the green and blue image channels is important, since the absence of a signal in the R image might also be due to insufficient overall brightness of the image.

According to an alternative color normalization method, the intensity value of each pixel in each of the R, G, and B images is divided by a value K, where K is a value derived from the color reference object. For example, the color reference object may have a red color range FBR, a blue color range FBB and a green color range FBG, and K may be the sum of the three maximum intensity values I contained in the three color ranges. K may be calculated from $I_{max\_FBR} + I_{max\_FBB} + I_{max\_FBG}$.

One pixel $P_{x\text{-}Rnorm}$ of the normalized R image would have, e.g., the normalized intensity value $I_{pixel\text{-}P}/I_{max\_FBR}$. One pixel $P_{x\text{-}Bnorm}$ of the normalized B image would have, e.g., the normalized intensity value $I_{pixel\text{-}P}/I_{max\_FBB}$. One pixel $P_{x\text{-}Gnorm}$ of the normalized G image would have, e.g., the normalized intensity value $I_{pixel\text{-}P}/I_{max\_FBG}$. One pixel $P_{x\text{-}Bnorm}$ of the normalized rgb image would have, e.g., the normalized intensity value $I_{pixel\text{-}P}/K$.

The rules are preferably combined using various image analysis functions which recognize e.g., certain objects and structures. For example, different image analysis methods known in the prior art may recognize lines or spheres (gaseous inclusions). Corresponding rules might then read: IF at least three spherical inclusions per cm2 of depicted floor area were recognized in the course of the image analysis, THEN assign an increased probability of occurrence to all candidates for a manifested performance indicator, which is associated with flatulence. The IF part of the rule is also referred to as the premise, the THEN part as the conclusion.

For example, it has been observed that, in the case of an animal disease of, e.g., diarrhea or coccidiosis, small amounts of blood or body salts or tissue abrasions are already discharged into the stool at a very early stage of the disease. The iron-containing hemoglobin contained in the blood is oxidized and increasingly changes the color of the stool to dark, later black stool. This transition is gradual and, according to embodiments of the invention, is used as the basis for creating a rule or is, with high probability, a relevant optical property, which an analysis algorithm, trained on a corresponding training data set, uses to carry out the image analysis described here. The "black proportion" of the excretions is thus used by the analysis software as an indication of the presence of blood in the feces and of the presence of diseases which may cause this property. According to embodiments of the invention, further steps are carried out during the image acquisition to further optimize and structure the image details, like the illumination of the excretions by a light source during the image recording. The light source may be, e.g., a simple flashlight source, a white light source, a yellow light source, an infrared light source, a light source which emits fluorescent light and excites feces, which contains a fluorescing indicator substance, using a corresponding spectral excitation frequency to emit a light signal, a halogen lamp, or in general a light source for light in a defined, short- or long-wave frequency range. Multiple different light sources may also be sequentially used, or an illumination with light of different wavelengths may be sequentially carried out by the same light source, wherein the goal is to record as many details as possible of the intestinal function, which affect the optics of the excrement, in the images.

In another step, the current daily electronic details, e.g., the RGB values of the image recording with the same electronic details of the previous days, e.g. 5 or 7 days, are compared in a statistical method, e.g. discriminant analysis, in order to verify a statistically demonstrable deviation or conformity of the current measured value from/with the measured values of the past from precisely this barn and this breed of animals and this feeding at exactly that of the present time, etc.

In another step, the production-technical measured values occurring in the daily routine are also compared for normality or abnormality in order to refine the conclusion of the image measured value. Thus, increase in water consumption, e.g., at the point in time of an abnormality in the image results may indicate an onset of diarrheal disease, which would occur on its own even in hot weather without reference to future health risks. A reduced feed consumption, determined from the daily measured values of mechanical or manual feeding, combined with abnormal image measured values of the stool, combined in turn with increased water consumption, indicates, with a high probability, an emerging disease with a febrile background, often a bacterial disease, e.g., respiratory disease or colisepsis. Treated early, one may count on few antibiotics and hardly any loss of performance; when recognized too late, these diseases lead to high mortality, high use of pharmaceuticals and reduced quality of the slaughtered animals.

Optionally, the rule-based analysis software may include a control module, which is designed to adapt the weighting of the rules of the rule database after receiving further data, in particular feedback data from slaughterhouses, so that the analysis result predicts this feedback data as accurately as possible based on the recordings of the excretions.

A cluster analysis is understood here to mean a method for discovering similarity structures in data sets. The data sets may, in particular, comprise data sets of data assigned to one another, wherein the data assigned to one another may include, in particular, images of excretions from animals, empirically collected manifestations of performance indicators of these animals, measured values from sensors in animal barns and substances administered to the animals. The groups of "similar" data sets found in this way are designated as clusters, the group assignment as clustering. The found similarity groups may be graph-theoretical, hierarchical, partitioning or optimizing. According to embodiments of the invention, the analysis software or parts of the analysis software, in particular the server application, includes one or more cluster analysis algorithms or an interface to the corresponding program of third party vendors. For example, the programming language R of the GNU project offers class libraries, which include cluster algorithms, among others. According to one embodiment, k-means is used as the cluster algorithm.

The subsequent descriptions relate to photographs from a poultry fattening farm, as they are used as examples for an input image for the analysis software according to the embodiments of the invention described here. Optionally, further information, in particular analog and digital measurement values and metadata from the barn technology (feeding, drinking water supply, ventilation, harmful gas detection) may be used as automatic and/or manual inputs for the analysis software. According to embodiments of the invention, the analysis software is preferably designed to predict the manifestation of one or more performance indicators. These performance indicators of an analysis software which is used to monitor poultry houses or husbandry systems include, in particular, essential diseases like clostridiosis, coccidiosis, swine dysentery and salmonellosis. Depending on the animal species to be monitored by the analysis software, the selection of the performance indicators taken into account by the analysis software may be different and, depending on the implementation variant, may depend on the defined rules or the training data set on which the analysis software is based. Analysis software for monitoring pigs, calves, piglets, cows, and beef cattle include, e.g., pigs/calves—salmonellosis, pigs—Lawsonia's disease, calves—cryptosporidiosis, and others. According to some embodiments of the analysis software, it is also conceived of for universal use in barns and enclosure systems for both poultry and mammals and covers a correspondingly wide range of performance indicators. The following photographs show excretions from broiler chickens and turkeys; however, the analysis software may also be designed (trained or explicitly programmed) in an analogous way so that it processes corresponding images of excretions from calves, piglets, and/or pigs in an analogous way, without these embodiments being explicitly depicted and explained in the following.

Referring now to FIG. 1, a computer system 100 with an analysis software 108 for monitoring the health of animals 132 of an animal barn 130. The animal barn may be, for example, a large animal barn of a fattening farm for broiler chickens, turkeys, pigs, or cattle. On large fattening farms in particular, there is a risk of outbreaks of infectious diseases and the economic damage connected thereto. A plurality of animals are located in the animal barn, typically of the same species, indicated here with the symbol "A". One or more employees 138 of the animal fattening farm regularly check the animal barn, for example, to check whether the watering device nozzles of the drinking water system are still well drained, the bedding is fresh, and/or sufficient feed is available at the feeding locations. Employee 138 preferably has an image capture unit with him, for example, in the form of a camera of a smartphone 142. The smartphone is preferably connected to the Internet 136 via a network connection, in particular the mobile radio network and/or via a local WLAN connection.

In addition, the distributed computer system depicted in FIG. 1 includes a further computer system 100, which may be designed, for example, as a server computer system or as a normal desktop computer system of another user 116. Other user 116 may be, for example, a skilled employee, who is to monitor the health of the animals of one or more animal barns of the fattening farm, and who is not necessarily on site, thus, in the vicinity of animal barn 130. Computer system 100 includes one or more processors 106, typically also a display 112, and a network interface 114, with which it is connected to a network 136. In addition, it includes a storage medium 104, typically a hard drive, which contains a plurality of images 102 of excretions from animals 132. Images 102 are preferably stored in a database, in particular, a relational database. This database may also contain further data, in particular, measured values 110 from sensors 134, which are optionally placed within or in spatial vicinity to animal barn 130. The sensors may be, for example, thermometers.

According to one embodiment, the sensors are sensors which measure the amount of the feed or drinking water currently administered or administered over a certain time interval. This may be advantageous, since reduced appetite or increased thirst may be early signs of an infection or diarrheal disease. According to another embodiment, the sensors may include sensors for detecting the ammonia content of the air. A diarrheal disease is often associated with an increased excretion of protein, which is then converted to ammonia in the bedding in the barn and received as a measured value by the analysis software and, in addition to the optical parameters of the feces, is evaluated during the analysis in order to achieve a particularly high level of analysis and prediction accuracy by combining the optical properties of the excretions and the ammonia content of the air.

In addition, storage medium 104 contains analysis software 108 which is designed to access images 102 in order to specify these and, optionally, further available predictive data, for example, measured values 110 or animal-related metadata (for example, the currently administered substances, thus animal feed type, feed additives, medications, etc., their dosage or mode of administration).

In the simplest case, the smartphone of user 138 does not contain a client application that is interoperable with analysis software 108. However, the smartphone camera and associated camera software that are currently already integrated in practically all smartphone models are installed on the smartphone. The user may use the already existing software for creating photographs by means of a smartphone in order to produce multiple images of excretions from animals in the course of regular inspection rounds, typically once or several times a day. The images of the excretions are preferably recorded at several different locations in the animal barn. User 138 may then subsequently transmit the recorded images to computer system 100 via network 136. For example, the user may send an email to an email address of user 116, which contains the pictures of the excretions as an attachment. User 116 may then save the images in the database so that the analysis software may access the images. Images 102 of the excretions are preferably stored, linked to a time indication which indicates, at least approximately, the point in time of the image recording.

After the current images of the excretions have been stored in the database, user 116 may call up analysis software 108. The analysis software may be implemented in any conventional programming language, for example in Java, C++, C#, and others. The analysis software reads all images of the excretions from the animals, which were recorded within a predefined time interval, for example, a week, and stored in the database, and uses them as input in a subsequent analysis step. Optionally, sensor measurement values 110 and metadata, which are stored, linked to images 102 in the database, may also be read by the analysis software and evaluated during the analysis. The measurement data and/or metadata are stored in the database linked to those images 102 which were recorded at a point in time which is in chronological proximity to the recording of the metadata or the measurement values.

In some embodiments, the analysis by analysis software 108 comprises a calculation of a recommended action. A recommended action is an action, which is manually or automatically carried out and which is suitable for maintaining the current physiological state of the animals or to improving it. The calculation of the recommended action is carried out as a function of images 102 read by the analysis software and, if available, further data, for example measured values 110 and/or the information on currently administered substances. Additionally or alternatively, the analysis by the analysis software comprises a prediction of a manifestation of a performance indicator of one or more animals 132 in animal barn 130. For example, the analysis software may be configured such that the prediction is based on a specific future moment, calculated from the current moment, to which the analysis relates, for example, a moment 2 or 3 days in the future. With regard to the recommended action, it may also be an action which is recommended to be carried out at a future point in time, for example in 2 or 3 days starting from when the analysis is carried out. However, it may also be an action whose immediate implementation is recommended. The exact point in time of the recommendation depends on the type of action and on the implementation of the analysis software, in particular, on the explicitly specified rules (in a rule-based system), or on the composition and annotation of the training data set used to create the analysis software by means of machine learning.

Preferably, both types of calculation and prediction are carried out in the course of an analysis. It is possible that, as a result of the analysis, it is not recommended to carry out an action because the current and predicted performance indicators are good. In some embodiments, the user may also specify via a GUI, or it may be specified in a configuration file, whether the analysis software should only calculate and output a recommended action, or alternatively, calculate and output a future manifestation of a performance indicator, or both.

The output may, for example, be carried out via display 112 of computer system 100 to user 116, so that said user may undertake suitable measures to maintain or improve the health status of the animals. The performance indicator may be, for example, the presence of a certain disease in one or more animals 132 in the animal barn.

For example, the analysis software may be designed to use images 102 of the excretions of the animals to calculate the presence and the future degree of manifestation of various diseases. The diseases are, in particular, coccidiosis (infestation with coccidia), clostridiosis (infestation with clostridia), diarrhea or sepsis caused by various bacteria, in particular, coccidia, clostridia, *Escherichia coli*, and/or *Salmonella*).

In the event that, for example, the analysis software detects a current infestation of some broiler chickens with coccidia and predicts a population-wide outbreak of the disease in 2-3 days, the analysis software outputs a warning message to user 116 via screen 112. The warning message contains the information that a population-wide outbreak of coccidiosis is to be expected in the next 2-3 days in animal barn 130.

The causative agent of coccidiosis, *Eimeria tenella*, causes bleeding inflammation of the small intestine or appendix, in particular in chicks aged 2 to 6 weeks up to 8 weeks. Coccidiosis is accompanied by bloody diarrhea, which, in the case of coccidiosis of the appendix may lead to a mortality rate of up to 80 percent due to exsanguination.

Coccidiosis of the small intestine mainly occurs in young animals, but also in weakened, old animals. It manifests in inflammation of the small intestine, where bleeding and tissue breakdown may occur. This is due to the occurrence of various types of coccidia, such as *Eimeria necatrix* and *Eimeria tenella, Eimeria brunetti* and *Eimeria gallopavonis*. The latter two strains lead to slimy diarrhea; however, rarely to bleeding. The mortality rate for coccidiosis in small intestine and rectum is 30 percent due to fluid loss.

Based on the characteristic stool pattern (darkly discolored feces, due to the blood/oxidized hemoglobin, in the case of coccidiosis of the appendix, or the slimy, thin consistency of the feces for coccidiosis in the small intestine), the analysis software may recognize and predict the current outbreak or a probably future outbreak of coccidiosis and its sub-forms. The consideration of further parameters, in particular measured values, such as the amount of feed consumed per animal or per barn and day, are likewise taken into account in the analysis according to embodiments of the invention. Loss of appetite, which is associated with reduced feed intake, may be taken into account as a further measurement parameter value and is an indicator of a possible coccidia infection in chickens.

Bloody diarrhea in chicks is mostly due to infection with coccidia, while diarrhea, such as occurs in coccidiosis of the small intestine and rectum, may also result from feed. Therefore, it may be advantageous to also consider metadata in the analysis. These include, for example, animal species, age of the animals, type of feed currently administered and other information. For example, analysis software 108 may be designed to display a GUI on display 112, via which user 116 may enter the stated metadata, so that it may be stored, together with images 102, in the database and may likewise evaluated by analysis software 108. Alternatively or supplementally to the GUI, the analysis software may have an interface, via which the stated data may also be automatically received from a storage medium, from other software (e.g. barn management software) and/or from sensors or barn equipment (e.g. feeding and drinking water systems).

In addition to the prediction of the *Clostridium* infection, the message which the analysis software outputs may preferably also include a recommended action, for example, the information that medications effective against coccidiosis should be immediately added to the feed or drinking water. Optionally, the message might also contain several recommended actions, e.g., the information that the additional administration of multivitamin and mineral supplements is recommended in order to compensate for the loss of electrolytes and to achieve the fastest possible recovery. As coccidia are extremely environmentally stable and may survive in the area for many years, the message may also include a recommendation for disinfecting the affected barn.

The "manifestation" of the performance indicator "coccidiosis disease" may therefore be a more detailed characterization of the disease (appendix coccidiosis or small intestine/rectum coccidiosis) and/or a prediction of the severity of the disease at a certain point in time, because the respective composition of the pathogen influences both the severity of the disease and also the consistency of the feces.

FIG. 1 illustrates computer system 200 which similar to computer system 100 of FIG. 1 that contains analysis software 108. However, computer system 200 is a portable computer system, for example, a smartphone with an integrated image capture unit 140, which user 138 takes with him on his inspection round through the barn. Portable computer system 200 includes a storage medium 202, on which analysis software 108 and images 102 of the excretions from the animals, which are recorded currently (or were recorded in the past), are stored, for example, in the form of several data sets of a relational database. Optionally, the computer system may have an interface 210, via which it may receive sensor measured values 110 from one or more sensors 134. Sensor measured values 110 may then likewise be stored on storage medium 202 or in the database located thereon. The computer system has one or more processors 204, a display device 206, and preferably also a network interface 208. Sensor interface 210 may be, for example, an interface for near-field communication, such as a Bluetooth interface or an RF (radio frequency) interface. However, it is also possible that sensor interface 210 is designed as a network interface 208 or that no measured values 110 are received at all. Analysis software 108 is designed as a so-called "standalone" software application, i.e., even in the event that no network connection is available, software 108 may independently receive images 102, which are recorded by camera 140 of the excretions from animals 132, and evaluate them in the course of an analysis.

Figure 2:
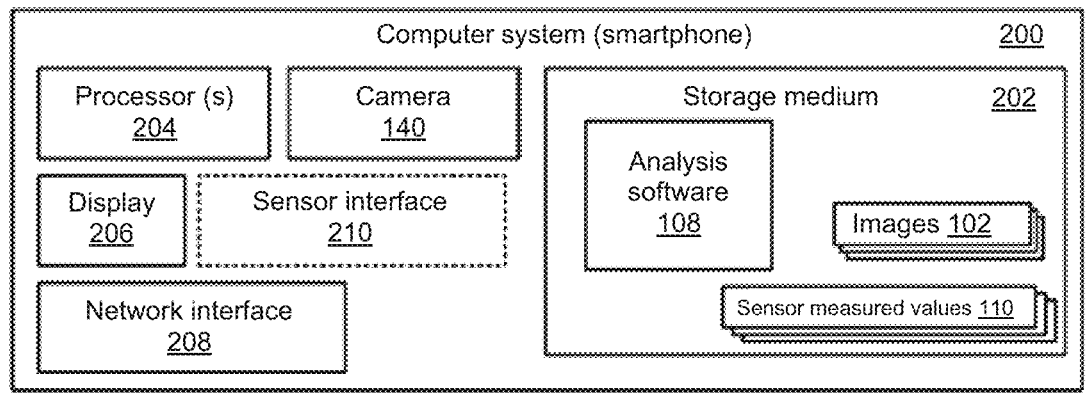
FIG. 2 schematically illustrates the computer system as in FIG. 1, which is designed as a smartphone.

The result of the analysis, a recommended action and/or a predicted manifestation of a performance indicator of the animals, is/are then output by analysis software 108. The output may be carried out, for example, to the user of computer system 200 via display 206. The embodiment shown in FIG. 2 has the advantage that, even in animal barns or areas in which no network connection or mobile radio connection is available, a user of computer system 200 is in a position to recognize diseases or other health problems of the animals early, in a simple and intuitive way and without special training, and to take suitable countermeasures, in that the user simply records multiple images of excretions from the animals with his smartphone camera 140 and inputs them into analysis software 108 for analysis. Analysis software 108 preferably includes a functionality for controlling camera 140, so that the camera functionality is integrated into the analysis software, which makes it easier to use.

Figure 3:
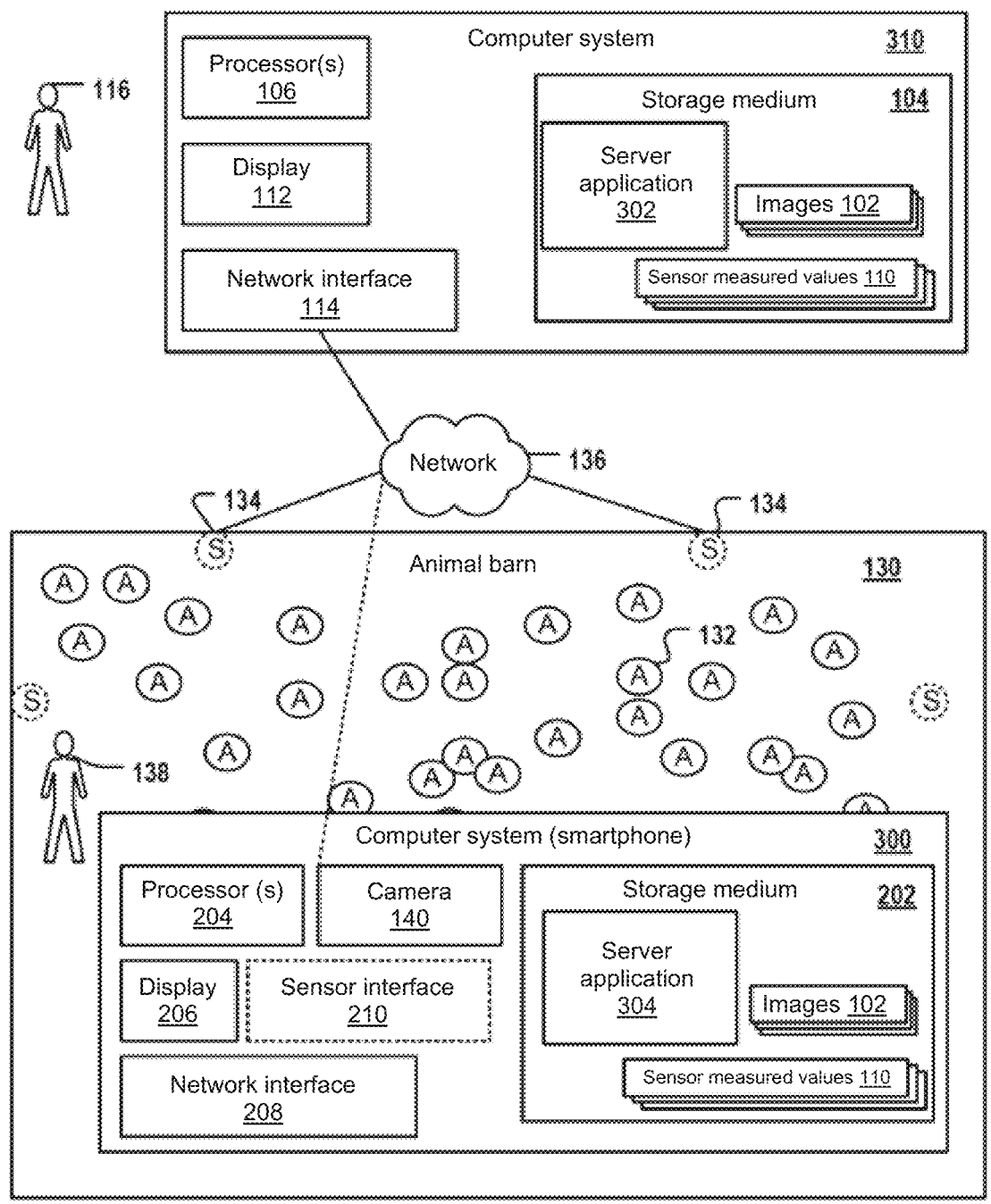
FIG. 3 schematically illustrates a distributed computer system with an analysis software, which is designed in the form of a client-server architecture.

FIG. 3 illustrates a distributed computer system 310 with an analysis software, which is designed in the form of a client-server architecture. This means that some of the functionalities of analysis software 108 are now taken over by a server application 302 which is installed and/or instantiated on a server computer 310, and that some other functionalities of analysis software 108 are carried out by a client application 304 which is installed and/or instantiated on a client computer system 300. The client computer system is preferably designed as a portable computer system, for example as a smartphone or tablet computer of a user 138. Client application 304 is interoperable with server application 302, which means that both applications are designed to exchange data and control commands in a coordinated via a network 136 in order to provide the already described analysis functionality of analysis software 108 in the interaction.

Server application 302 is preferably designed to interact with a large number of client applications, wherein the data exchange is session-bound and a client application has no access to the data which other client applications are exchanging with the server application. Typically, a previous registration with the server application is required for the users of the respective client applications before the analysis functionality may be carried out.

The functionality of the analysis software is typically distributed to the client and the server applications in such a way that client application 304 is designed to control an image capture unit 140, which is a component of client computer system 300 or is operatively connected to it, in order to cause the same to record one or more images of excretions from animals 132. For example, client application 304 may have a graphical user interface, which enables user 138 to record one or more images from selected locations on the floor of the animal barn via camera 140 and to transmit them from the camera to client application 304. Optionally, the recorded images may be stored locally on storage medium 202 of the client application. In addition, in some embodiments, client application 304 may be configured to receive sensor measurements 110 from one or more sensors 134 and to store them locally. As already described, this may occur via a network interface and/or a near field interface 210. Alternatively or additionally, the GUI of client application 304 may contain a plurality of input fields which enable user 138 to enter metadata into the client application relating to the animals or the animal barn. These metadata include, in particular, animal species, age of the animals, currently administered medication, feed and feed additives, the amount of feed or drinking water currently administered per animal or animal barn per day.

The server application is designed to receive images 102 from the client application (or several client applications) via network 136 and preferably to store them in a database of the server computer. The storage is preferably carried out such that an identifier of the client application, which may also be designed as a user ID or animal barn ID, and an approximate point in time of the recording of images 102 are stored, linked with received images 102. The server application then performs an analysis of received images 102 in reaction to a trigger mechanism. The trigger mechanism may be, for example, the receipt of the images or a user interaction with the server application or a control command from an automatic timer (for example "cron job"). Not only the images currently received from client application 304, but instead preferably all of the images of the excretions received from this client application within a predefined time interval are analyzed. In some embodiments, client application 304 and/or server application 302 may have a filter function which filters out images and does not forward to the server application or does not take images into account in the analysis, which have a resolution that is too low or a proportion of the image which actually depicts the excretions is too small.

In some embodiments, all measured values may first be received from the client application and then transmitted to the server application via the network. In other embodiments, the server application is designed to receive sensor measured values 110 from the sensors of an animal barn or animal enclosure, which are assigned to client application 304, via a network interface 114. It is also possible that the server application receives one part of measured values 110 from the client application and another part directly from sensors 134 via network interface 114. An assignment of measured values 110, optionally likewise obtained metadata and digital images 102, to a specific client application and/or to a specific animal barn may be carried out, for example, via a common client application ID, which is transmitted to the server application as a component of both images 102 and the metadata and the measured values.

Figure 4:
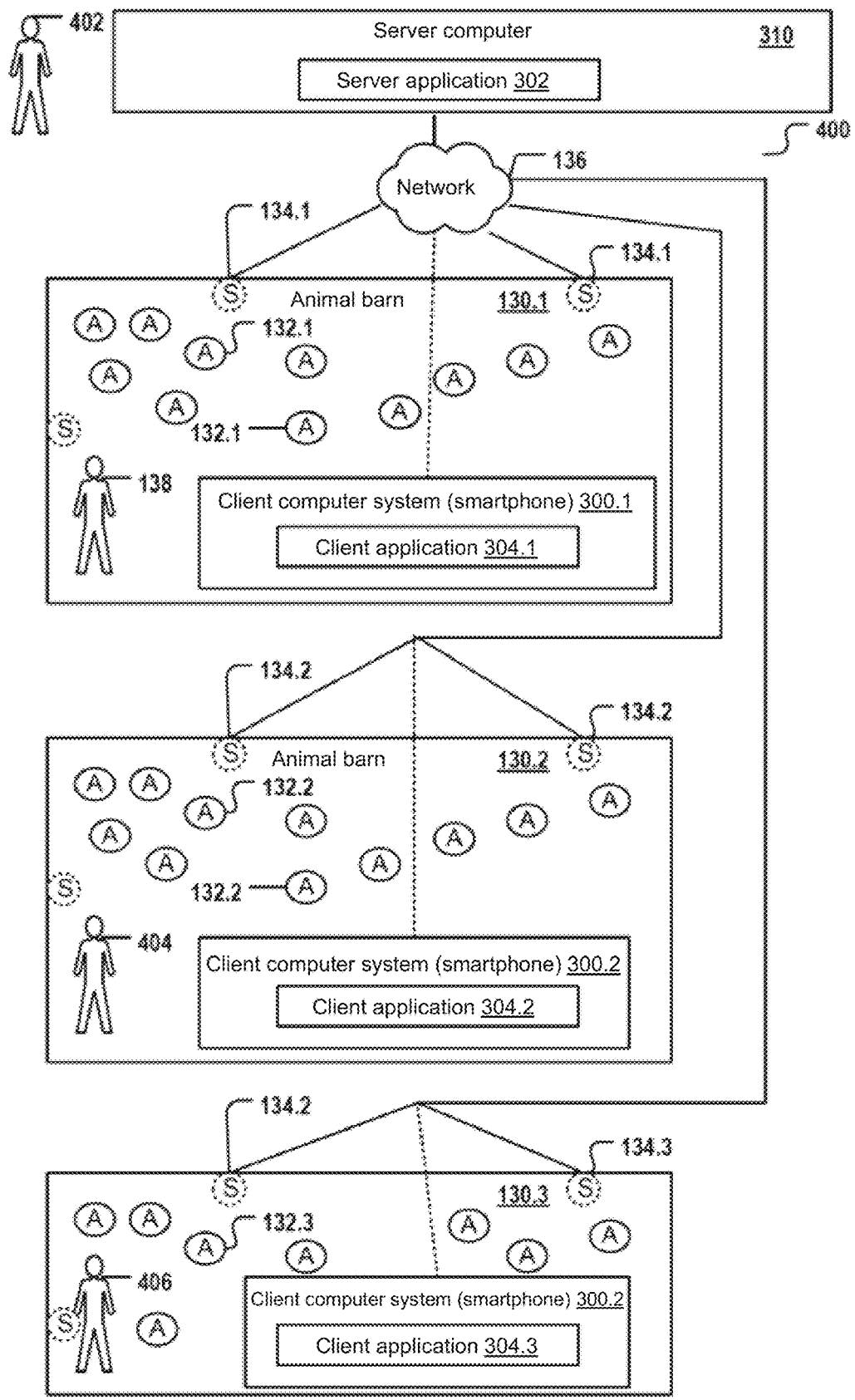
FIG. 4 schematically illustrates the distributed computer system of FIG. 3, comprising a plurality of client computer systems.

FIG. 4 is a block diagram of a distributed computer system which includes, like the distributed computer system depicted in FIG. 3, a client computer 300.1 and a server computer 310. Analysis software 108 is designed in the form of a client-server architecture. The distributed system further comprises client computer systems 300.2, 300.3, which are each assigned to other client applications 304.2, 304.3, other animal barns 130.2, 130.3 and possibly also other users 404, 406.

This embodiment has the advantage that empirical data, in particular image data of excretions of the kept animals, measured values recorded by sensors, observed manifestations of performance indicators, as well as metadata (such as animal feed, feed additives, animal species, animal age, and the like) may be centrally stored in a database of server computer 310. The server application preferably includes expanded analysis functions, in particular cluster analysis methods. By applying various cluster analysis methods to the available data, which include, in particular, image data from excretions, measurement data, metadata, and also data (in particular image data) from observed manifestations of performance indicators, it is possible to determine group (so-called clusters) of animal barns with similar performance levels in the animals. A comparison of the currently used feed, veterinary preparations, and feed additives, which are administered to the animals in the individual clusters, makes it possible to determine whether a certain substance or feed composition or a feed supplier or breeding company correlates to particularly high or particularly low performance of the animals. It is thus possible, based on objective, empirical data, to recognize feed or feed additives or vendors, which have a beneficial effect on animal health for a specific type of animal or for a specific starting point (e.g. suspected infestation with certain pathogens).

Figure 5:
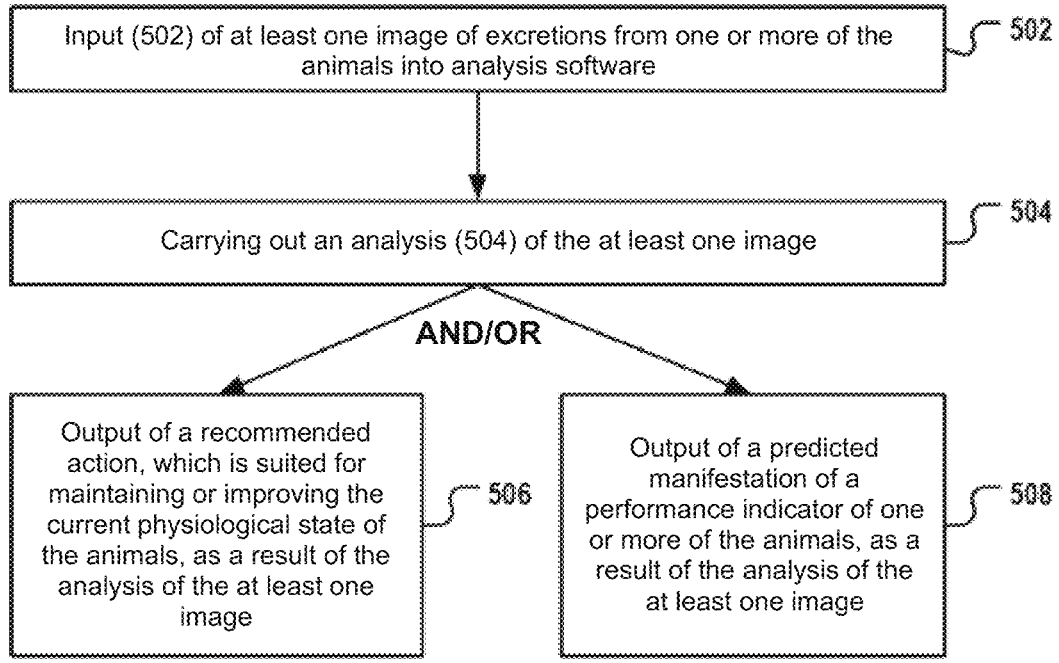
FIG. 5 is a flow chart of a method for keeping animals.

FIG. 5 is a flow chart of a method for keeping animals. The method may be used, in particular, to monitor the health and performance of animals. In a first step 502, an input into analysis software 108 is carried out of one or more images 102, which show excretions of animals 132. For example, the analysis software may obtain the images directly from a local image capture unit, or read them from a local data memory, or obtain them via a network from a client application or a robot application. It is also possible for the images to be transmitted via an email application or, in "real time", via an APP application to the computer on which the analysis software is instantiated, and then semi-automatically from an email application of this computer to the analysis software. The analysis software carries an analysis of the input images in a next step 504, in order to obtain an analysis result. The analysis result may propose one or more recommended actions which are suitable for maintaining or improving the current physiological state of the animals, and/or a predicted manifestation of a performance indicator of the animals. The analysis result thereby depends on the received images of the excretion and, if available, on measured values 110 and/or further metadata. The metadata may include substances or substance mixtures which were administered to the animals at the point in time of the analysis. The analysis also preferably relates to images and the optional measured values and/or metadata which were received within a defined time interval before the analysis, e.g., within 7 days before the analysis was carried out. Subsequently, the recommended action is output in step 506 and/or the predicted manifestation is output in step 508. The output analysis results may therefore include either the recommended action or the predicted manifestation of the performance indicator or both. The output may, for example, be carried out for a user via a GUI of the analysis software.

Figure 6:
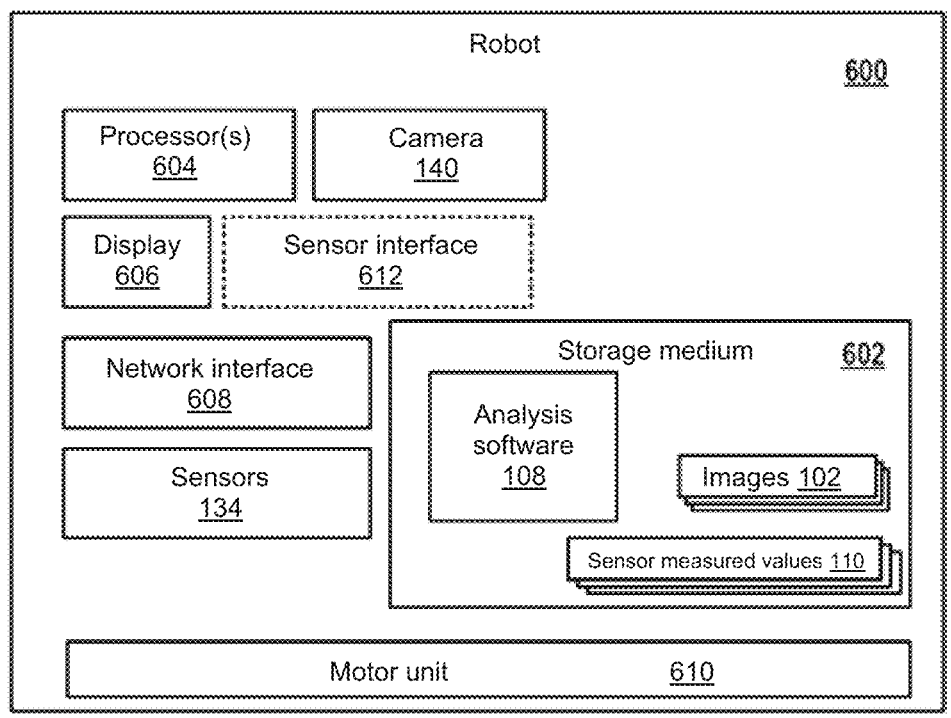
FIG. 6 is a block diagram of a mobile robot for monitoring the health of animals.

FIG. 6 is a block diagram of a mobile robot 600 for monitoring the health of animals. Robot 600 may be used, for example in an animal barn 130, as described with reference to FIGS. 1, 2, and 3. The robot may be used, for example, to take over or assist with some of the work from employees 138, particularly some inspection rounds. The robot includes one or more processors 604, and optionally a display device 606, via which a user may interact with the robot. The robot likewise optionally includes a network interface 608 in order to be able to exchange data with a network, in particular the Internet. For example, network interface 608 may be used by robot software 108 to transmit images 102 of excretions from the animals in the animal barn, which were recorded by one or more cameras 140 of robot 600, via network 136 to a server application 302. Robot software 108 may be an analysis software as this was already described for embodiments of the invention. The analysis software is designed, in particular, to analyze images 102 recorded by camera 140 and to output a recommended action and/or a predicted manifestation of a performance indicator. The output may, for example, be carried out to a user via a GUI by means of display 606. The robot may comprise a storage medium 602 on which recorded images 102 are locally stored. In addition, the robot may optionally have a sensor interface 612 to one or more sensors 134 of the animal barn. Sensor interface 612 may be, in particular, an interface for near-field communication, for example, a Bluetooth interface or an RF interface. Supplementally or alternatively to sensor interface 612, the robot may also include its own sensors 134, for example, a thermometer for measuring the floor temperature, moisture measuring devices, and the like.

The robot has a motor unit 610, for example, motor-driven wheels or tracks, which enable the robot to traverse the animal house largely autonomously. In some embodiments, the path for traversing may be fixedly predetermined in the robot software. However, it may also be that the movement path of the robot is not explicitly defined, but instead is calculated dynamically by the robot software based on certain optimization criteria in combination with dynamically detected obstacles which are bypassed.

In some embodiments, camera 140 is oriented and positioned at a height such that recorded digital images depict an area of the ground in the vicinity of the robot In some embodiments, the height and/or orientation of the camera is able to be changed, wherein the change in the height and/or the orientation of the camera may be carried out manually and/or automatically. The change in height or orientation is preferably carried out automatically and is controlled by robot software 108, which includes a function for analyzing the quality of the images recorded by camera 140. If the resolution is too low or the proportion of the image which actually contains the excretions from animals is too small, then the height and/or the orientation of the camera is automatically adjusted so that the next images have a sufficiently large image area, which shows the excretions in high resolution and sufficient contrast. Additionally or alternatively to the height or orientation of the camera, the (optical or software-based) zoom of the camera may also be changed automatically or manually so that the recorded images satisfy the quality criteria of the robot software.

Figure 7:
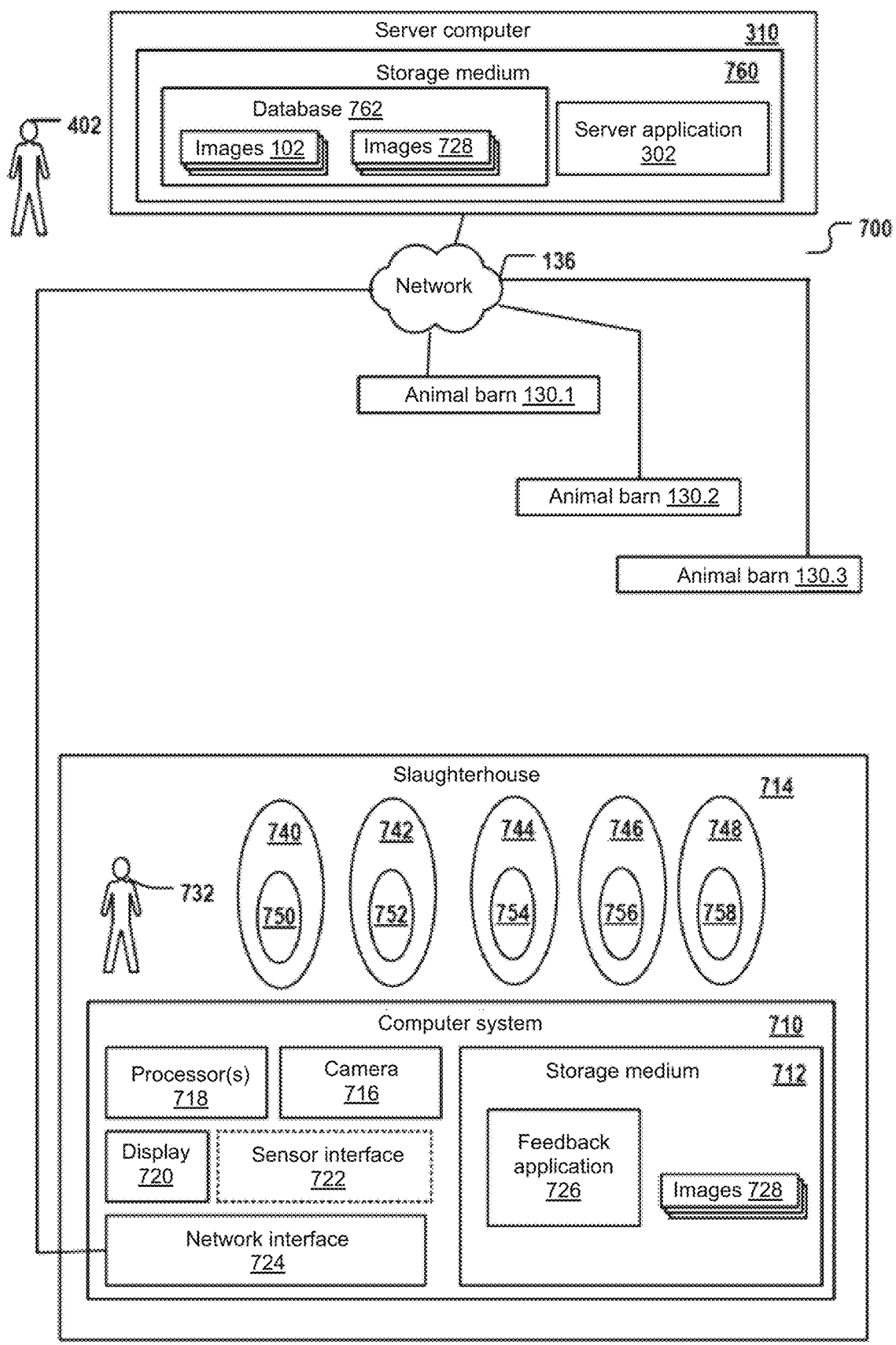
FIG. 7 schematically illustrates the distributed computer system of FIG. 3 or 4, further comprising a computer system of a slaughterhouse with a feedback application.

FIG. 7 is a block diagram of a distributed computer system 700, as described in FIGS. 3 and 4. Distributed system 700 also includes one or more computer systems 710 of a slaughterhouse 714, which are preferably mobile computer systems. It is also possible that system 700 comprises further computer systems of further slaughterhouses (not shown here). In slaughterhouses, it is common for employees 732 of the slaughterhouse operation to check the health of the slaughtered animals routinely or as a random sample by carrying out an inspection of the gastrointestinal tract 750-758 of slaughtered animals 740-748 after the slaughter.

According to one embodiment of the invention, a mobile computer system 710 is assigned to an employee 732 of the slaughterhouse. Mobile computer system 710 may be, in particular, a smartphone or a tablet computer. One or more processors 714[sic: 718], a display device 720, and a network interface 724 are located on computer system 710. In addition, computer system 710 comprises a storage medium 712 with a feedback application 726. In addition, the computer system 710 includes an image capture unit 716, for example, a smartphone camera. Feedback application 726 is interoperable with server application 302. It may be, for example, a variant of the client application already described above, which has an additional function of transmitting images of the gastrointestinal tract of slaughtered animals to the server application, instead of or supplemental to the images of the excretions. User 732 may start feedback application 726 and prompt it, for example, by interacting with a GUI of the feedback application, to produce digital images 728 of gastrointestinal tracts 750-758 of freshly slaughtered animals 740-748,132 with the aid of camera 716. Optionally, these images 728 may be stored locally on storage medium 712. In any case, they are transmitted from feedback application 726 to server application 302 via network 136. Images 728 represent feedback information, since they provide information about the health status of the animals, particularly as regards the gastrointestinal tract, on the day of slaughter. Images 728 thus represent empirically recorded manifestations of one or more performance indicators at a specific point in time. Images 728 may be provided, for example, with an identifier of the animal barn or fattening farm from which they originate, so that they are assigned, via this indicator, in database 762 of the server computer to images 102 of the excretions of the animals of the same animal barn or fattening farm some few days before their slaughter.

It is also possible to assign images 102, 728 as well as measurement data and metadata, if available, based on an identifier of individual animals. However, individual animals are often not individually recorded. It has been established that, in practice, it is also sufficient to carry out an assignment of the stated data in database 726 on the basis of identifiers of a particular animal barn or fattening farm, since the health status of the animals in the same animal barn is often identical or very similar, as this is relevantly determined by the presence or absence of infectious diseases. If a few animals are affected, then the entire animal population is usually infected within a few days. Therefore, an exact assignment at the level of individuals is not necessary for images 728 of the gastrointestinal tract of individual animals obtained in the slaughterhouses and images 102 of the excretions of individual animals obtained in the animal barns. In practice, an assignment based on a common animal barn and a chronological proximity of the recording of the images or other data of a few days or hours is sufficient.

Server application 302 is designed, for example, as a machine learning application, which is re-trained on a training data set at regular intervals. The training data set is preferably continuously supplemented, both with images of excretions from animals of one or more animal barns and also with associated empirically recorded manifestations of performance indicators, in particular images of the gastrointestinal tract of slaughtered animals which were produced in a slaughterhouse. It is also possible that these images are produced by the operator of the animal barns. For example, it can occur that individual animals already die in the animal barn and are precisely examined by the operator of the animal barn in order to determine whether a contagious disease was the cause of death. On this occasion, images of the gastrointestinal tract of the deceased animals may also be produced and transmitted to server application 302.

The machine learning software may be, in particular, software which is based on one or more neural networks. According to some embodiments, the machine learning based analysis software may use existing program libraries, e.g. Caffe, a program library for deep learning, deep learning4j (an open source software programmed in Java based on a neural network), the Java library ELKI, GNU R and others.

Machine learning software is software which has automatically acquired knowledge in a learning phase based on examples (a training data set), which this software may use to solve data processing problems. For example, the (trained) software may be designed and "trained" to automatically recognize images of excretions from animals, and optionally additional information linked to them (metadata, measured values), which a manifestation of a performance parameter of the animals currently has or will have in the near future, and what actions may be helpful to promote or stabilize the health of the animals so that a drop in performance is prevented or eliminated.

Figure 8A:
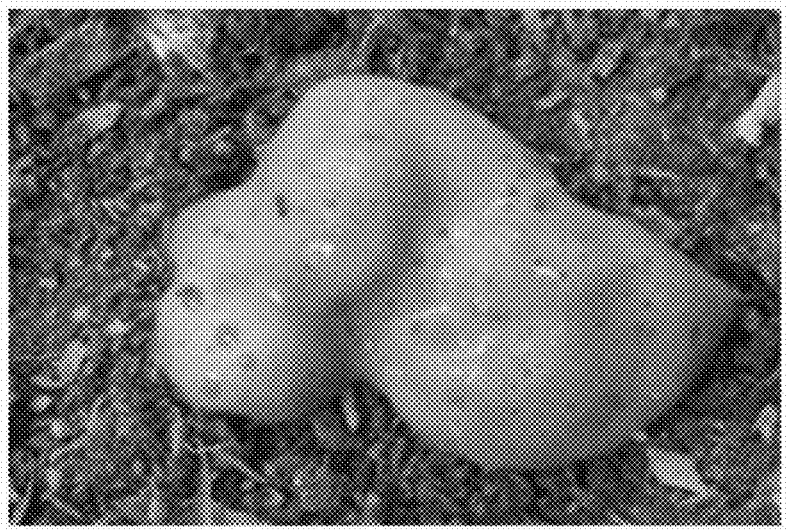
FIGS. 8A-8C are photographs of feces from turkeys, which suffer from an acute clostridial infection.
Figure 8B:
Figure 8C:

FIGS. 8A-8C are three photographs of feces from turkeys, which suffer from an acute clostridial infection. The low-viscosity consistency with bubble-shaped inclusions, which indicate diarrhea, is striking. The feces is colored yellow-orange, but not black. This is an indication that the diarrhea is watery rather than bloody. Bubble-shaped structures may be recognized by the analysis software, for example, by using algorithms to recognize lines, circles and other geometric objects.

Figure 9A:
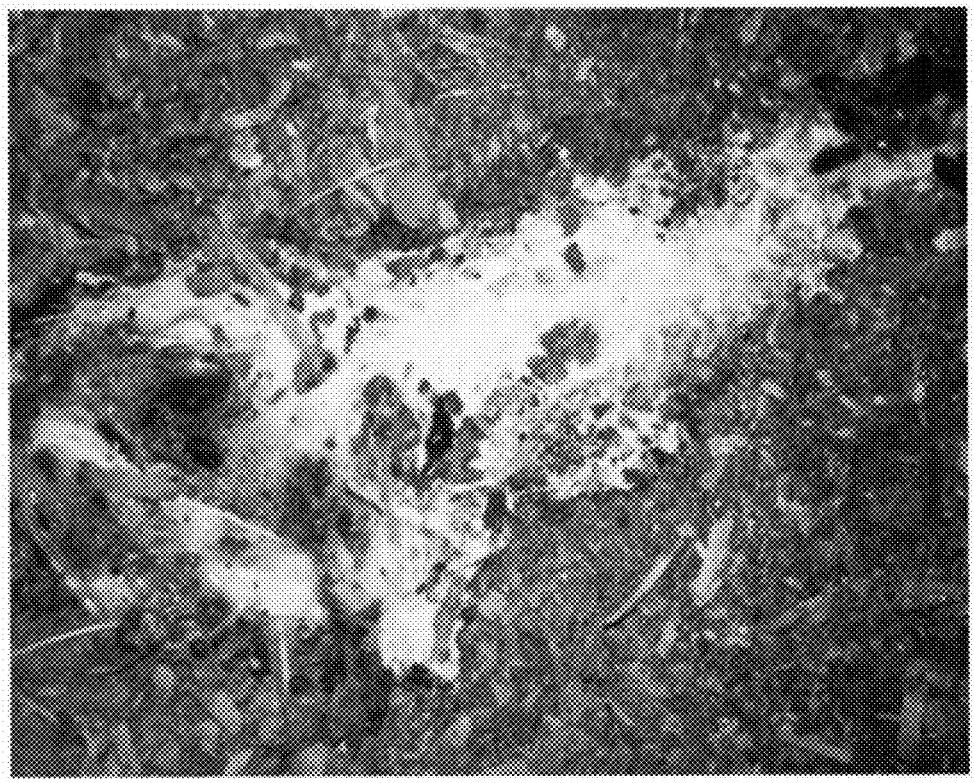
FIGS. 9A and 9B are 2 photographs of feces from turkeys, which suffer from acute colisepsis (sepsis caused by *Escherichia coli*)
Figure 9B:
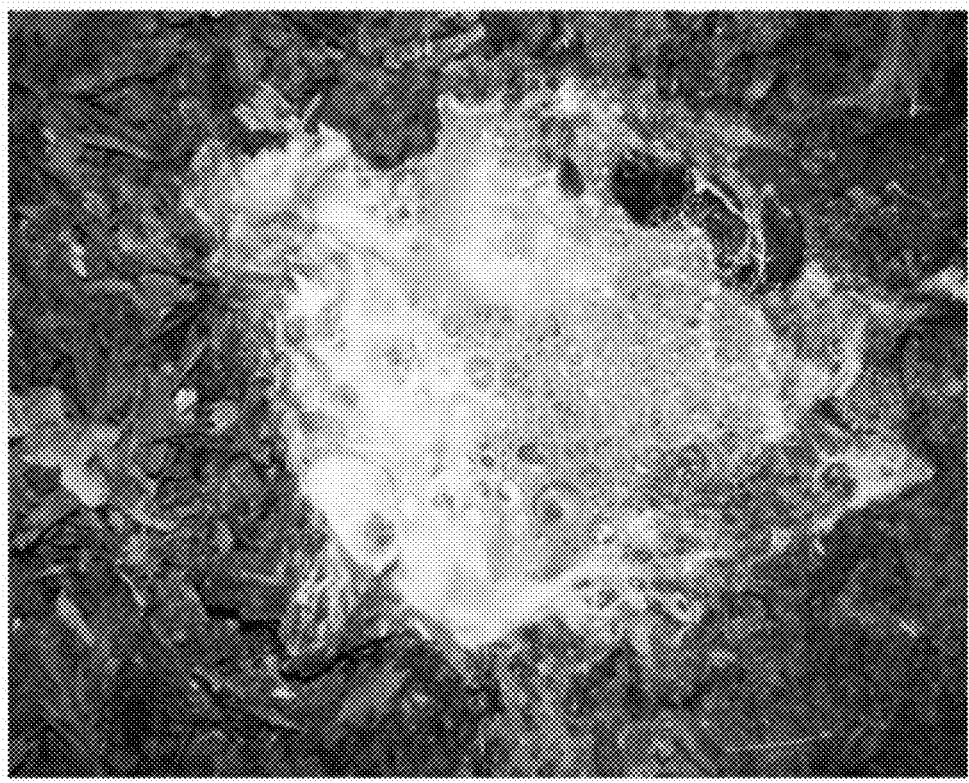

FIGS. 9A and 9B are two photographs of feces from turkeys, which suffer from acute colisepsis (sepsis caused by *Escherichia coli*). The consistency of the feces is likewise low-viscosity, slimy, white-yellowish in color with a partly greenish tinge. The yellow color is an indication of a lack of bile or a disorder of the pancreas. The greenish color indicates an infection, in this case with *Escherichia coli*.

Figure 10:
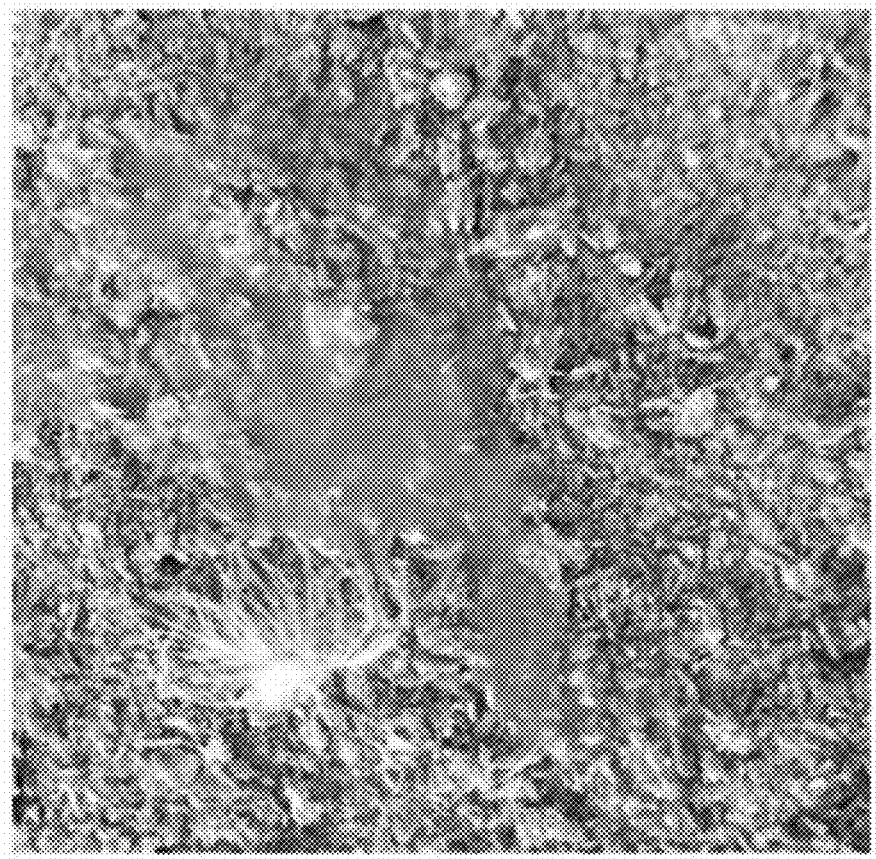
FIG. 10 is a photograph of feces from a turkey, which suffers from acute coccidiosis.

FIG. 10 is a photograph of feces from a turkey, which suffers from acute coccidiosis. In contrast to the feces depicted in FIGS. 9A and 9B, the feces depicted in FIG. 10 is uniformly discolored and clearly green. There are no bubble-shaped inclusions. The green color is an indication of a very advanced infection.

Figure 11:
FIG. 11 is a photograph of feces from a broiler chicken, which suffers from an acute co-infection of clostridia and coccidia.

FIG. 11 is a photograph of feces from a broiler chicken which suffers from an acute co-infection of clostridia and coccidia. The dark color of the feces is an indicator of significant blood loss and oxidized hemoglobin.

Figure 12:
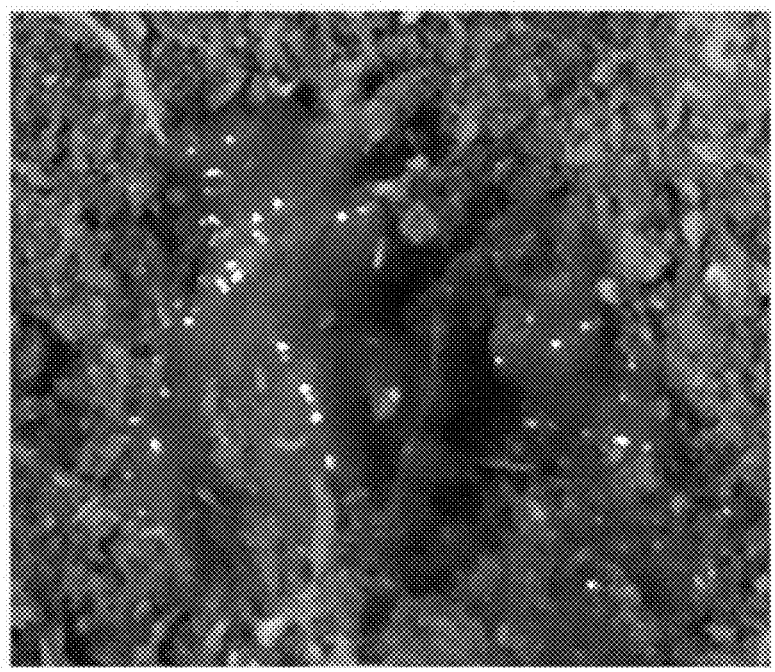
FIG. 12 is a photograph of feces from a broiler chicken which suffers from an acute clostridial infection.

FIG. 12 is a photograph of feces from a broiler chicken which suffers from an acute clostridial infection. A comparison of the photographs in FIGS. 12 and 8 shows that the color and consistency of the feces also depends strongly on the type of animal, in addition to the disease. Therefore, according to preferred embodiments of the invention, the type and/or breed of the animals, and preferably also their age is input in addition to the images of the excretions in the analysis software, in order to ensure that the analysis may consider these metadata.

Other embodiments will be apparent to those skilled in the art from consideration of the specification and practice of the embodiment disclosed herein. It is intended that the specification and examples be considered as exemplary only, with a true scope and spirit of the embodiment being indicated by the following claims.

What is claimed is:

1. A method for monitoring and maintaining a health of animals comprising:
   illuminating an animal excretion with a light source;
   recording at least one image of the animal excretion with a portable image capture unit;
   transmitting the at least one image from the camera to a storage medium comprising an analysis software, wherein the at least one image is a digital image, wherein the analysis software is a trained machine learning software;
   analyzing the at least one image with the analysis software;
   outputting a recommended action which is suitable for maintaining or improving the current physiological state of the animals, wherein the recommended action depends on a result of the analysis of the at least one image;
   implementing the recommended action with an electronic or mechanical system operatively coupled to one or more of a heating system for an animal barn, an air conditioning system for the animal barn, an automatic feeder system for the animal barn and a drinking water system for the animal barn, the recommended action causing the electronic or mechanical system to change one or more operational parameters of the one or more heating system, air conditioning system, automatic feeder system and drinking water system for the animal barn;
   providing a training data set, which contains a plurality of training images of excretions from animals of the same animal species as the animals that are to be kept, wherein the training images are annotated with metadata, wherein the metadata contain information about the manifestation of at least one performance indicator of the animals whose excretions are depicted in the training images, and wherein the metadata additionally contain the composition of the feed or drinking water which was administered to these animals at a point in time of the recording of the training images;

generating the analysis software by training a machine learning software using the training images.

2. The method of claim 1 further comprising outputting a predicted manifestation of a performance indicator of one or more of the animals, wherein the performance indicator is a physiological parameter, a disease symptom, or a disease, wherein the predicted manifestation depends on a result of the analysis of the at least one image.

3. The method according claim 2, wherein the action is to be carried out at an action point in time, wherein the action point in time is a current point in time or a first future point in time starting from a time of the analysis, and wherein the predicted manifestation of the performance indicator is predicted for a manifestation point in time, wherein the manifestation point in time is a second future point in time starting from the time of the analysis.

4. The method according to claim 2, wherein the output of the predicted manifestation of the performance indicator to a user and/or the output of the recommended action to a user is carried out via a user interface of the analysis software, and wherein the output of the recommended action is carried out to the electronic or mechanical system, which is operatively coupled to the animal barn or an area in which the animals are kept, wherein the electronic or mechanical system is designed to carry out the action upon receiving the recommended action.

5. The method according to claim 2, wherein the analysis software is implemented as a software application, which is instantiated on a mobile computer system, wherein the analysis software is designed to receive the at least one image of the excretions from a camera of the portable image capture unit of the mobile computer system, and to receive metadata or measurement data, to carry out the analysis of the at least one image, and to output the recommended action and/or the predicted manifestation of the performance indicator.

6. The method according to claim 2, wherein the analysis software is implemented as a distributed client-server software application, wherein the client-software is instantiated on a mobile computer system and designed to receive the at least one image of the excretions from a camera of the portable image capture unit of the mobile computer system, and to transmit the at least one image of the excretions to a server application, which is instantiated on a server computer system, wherein the server application is designed to receive the at least one image from the client application, to carry out the analysis of the at least one image for calculating the recommended action and/or the predicted manifestation of the performance indicator, and to transmit the recommended action and/or the predicted manifestation to the client application via the network, and wherein the client application is designed to output the recommended action and/or the predicted manifestation to the user of the mobile computer system.

7. The method according to claim 1, wherein the animals, whose excretions the at least one image depicts, are animals, to which a feed or drinking water, which is admixed with an indicator substance, was provided or administered before the recording of the at least one image, wherein the indicator substance is a substance which causes a coloration in the excretions of the animals depending on the physiological state of the animals.

8. The method according to claim 7, wherein the recording of the at least one image comprises positioning a color reference object in a spatial vicinity of the excretions, whose image is recorded, wherein the color reference object has one or more different colors, and wherein the analysis software is designed to use the colors of the color reference object during the analysis of the at least one image to normalize the colors of the excretions depicted in the at least one image, wherein the at least one image further depicts the color reference object in addition to the excretions.

9. The method according to claim 7, further comprising transmitting a control command to a lighting unit, which causes the lighting unit to illuminate the excretions during the recording of the at least one image of the excretions with light of one or more defined wavelength ranges, wherein the lighting unit illuminates the excretions sequentially with the light of a plurality of defined wavelength ranges, and wherein one or more wavelength-range specific digital images of the excretions are recorded during the illumination with each of the defined wavelength ranges, and wherein the analysis software is designed to carry out the analysis selectively, in a wavelength-range specific way, for the one or more images which were recorded with the light of the respective wavelength range.

10. The method according to claim 1, wherein the portable image capture unit is selected from a group comprising:
a camera of a smartphone; or
a camera mounted on a mobile robot or conveyor belt, wherein the robot or the conveyor belt is designed and positioned to move in an animal barn or area where the animals are kept.

11. The method according to claim 1, wherein the recommended action includes one or more actions which are selected from a group of actions comprising:
providing a specific animal feed or drinking water, administration of one or more medical or non-medical substances to the animals in a physiologically effective form, ending an ongoing administration of one or more medical or non-medical substances to the animals in the physiologically effective form, or changing physical parameters or the animal barn or area in which the animals are kept.

12. The method according to claim 1, wherein the disease is coccidiosis, salmonellosis, cryptosporidiosis, diseases caused by gastrointestinal parasites, gastric worms or intestinal worms, or unicellular pathogens, coli sepsis, lawsoniosis, swine dysentery, or a clostridial infection.

13. The method according to claim 1, wherein the animals are poultry, cattle, sheep, or pigs.

14. The method according to claim 1, wherein the analysis software is software based on predefined rules.

15. The method according to claim 1, wherein the at least one image comprises a plurality of images, wherein the input of the at least one image and the analysis of the at least one input image is carried out regularly at a frequency of at least once per day, wherein the respectively input images are digital images which were respectively currently recorded and depict current excretions from one or more animals; wherein the analysis is carried out selectively on those received images which were recorded within a predefined time interval prior to a point in time of the analysis.

16. The method according to claim 1, wherein the analysis software includes access to a database with data about inventories, belonging to a keeper of the animals, of different substances or substance mixtures, the method further comprising:
testing by the analysis software, whether the inventories are exhausted, with respect to the substance or substance mixture, following the removal of a quantity and type of a substance or substance mixture which is removed according to the recommended action; and automatically transmitting via a network of an order message by the analysis software to an electronic ordering system of a vendor of the removed substance or substance mixture.

17. The method according to claim 1, further comprising:

measuring values of one or more of: temperature of milk secreted by one or more of the animals, electrical conductivity of the milk secreted by the one or more of the animals, temperature of the animal barn, ammonia content and carbon dioxide content of air in the animal barn, moisture content of the air in the animal barn, quantity of feed supplied per animal or per animal barn per time unit or quantity of drinking water supplied per animal or per animal barn per time unit;

inputting at least one measured value of the measured values into the analysis software; and carrying out an analysis of the at least one measured value by the analysis software, wherein the recommended action and/or the predicted manifestation of the performance indicator depends on the result of the analysis of the at least one image and on a result of the analysis of the at least one measured value.

18. The method of claim 1, wherein the analysis software is designed as a distributed client-server software application, wherein the server application is connected via a network to a plurality of client applications, wherein one or more feedback applications, which are instituted on computers at slaughterhouses, are also connected via the network to the server application, wherein each of the client applications is operatively coupled to a respective portable image capture unit and is designed to transmit at least one image of excretions from animals, which the respective portable image capture unit has recorded, to the server application, wherein the server application is designed to carry out the following method:

receiving by the server application of at least one digital image from each of the client applications, wherein the at least one received image depicts excretions from one or more of the animals;

receiving at least one manifestation of a performance indicator of the animals, measured or entered by a user via a GUI, wherein the GUI is a GUI of one or more of the client applications or a GUI of one or more of the feedback applications, wherein the feedback application is a software application at a slaughterhouse, wherein the manifestation of a performance indicator comprises images of the gastrointestinal tract after the slaughter of the animals; and training a machine learning algorithm to automatically provide an improved version of the server application, wherein the training comprises an analysis of the received combinations made up of a digital image of the excretions and measured manifestations of the performance indicator.

19. The method of claim 1, wherein the analysis software is designed as a distributed client-server software application, wherein the server application is connected via a network to a plurality of client applications, wherein each of the client applications is operatively coupled to a respective portable image capture unit, wherein each of the respective portable image capture units is located within one of a plurality of different animal barns, and wherein the server application is designed to carry out the following method for each of the animal barns:

receiving a message, which specifies at least one substance or substance mixture, which is presently administered to the animals of the animal barn;

receiving by the server application from the client application of at least one manifestation of a performance indicator of the animals of the animal barn, measured or entered by a user via a GUI, wherein the manifestation of the performance indicator relates to a point in time in chronological proximity to the point in time of the administration of the substance or substance mixture;

carrying out a first cluster analysis of the combinations made up of the administered substance or substance mixtures and the manifestation of the performance indicator, received from each animal barn, to calculate clusters from animal barns where the substance or substance mixture administered is identical or similar, wherein an average manifestation of the performance indicator of the animals of each cluster is stored by the server application and linked to the respective cluster; and transmitting the result of the first cluster analysis to at least one of the client applications to output the cluster analysis results to a user.

20. The method of claim 19, wherein the method further comprises carrying out a second cluster analysis of the combinations made up of the administered substance or substance mixtures and the manifestation of the performance indicator, received from each animal barn, to calculate clusters from animal barns, whose animals have an identical or similar manifestation of the performance indicator, wherein the substance or substance mixture, which is administered in the majority of the animal barns of a cluster, is stored by the server application and linked to the respective cluster.

21. A system for monitoring and maintaining a health of animals, comprising:

a light source for illuminating excretions from one or more animals;

a portable image capture unit;

a computer system which is coupled to the portable image capture unit, wherein the computer system contains analysis software and a database, wherein the portable image capture unit is designed to record at least one image which depicts the excretions from the one or more of the animals, wherein the analysis software is configured to:

store the at least one recorded image in the database;

input the at least one recorded image into the analysis software;

carry out an analysis of the at least one image;

output a recommended action suitable for maintaining or improving the current physiological state of the animals, wherein the recommended action depends on a result of the analysis of the at least one image;

wherein the computer system is a distributed computer system comprising a server computer and at least one client computer, wherein the analysis software is designed as a distributed client-server software application with a server application on the server computer and a client application on each of the at least one client computers;

at least one slaughterhouse computer system configured for operation by a slaughterhouse and configured for coupling to a slaughterhouse image capture unit, wherein the slaughterhouse computer system includes a feedback application, wherein the slaughterhouse image capture unit is designed to record images which depict the gastrointestinal tract of one or more of the animals after slaughter, wherein the feedback application is configured to transmit the recorded gastrointestinal tract images to the server application via a network for storing the gastrointestinal tract images in the database;

wherein the server application is configured to receive at least one digital image of excretions from one or more of the animals from the at least one client application, and to store this at least one image in the database, wherein the server application is further configured to receive from the client application or from the feedback application at least one manifestation of a performance indicator, measured or entered by a user via a GUI of the client application or the feedback application, of the animals whose excretions are depicted in the at least one received image, wherein the manifestation of the performance indicator is, in particular, images of the gastrointestinal tract after the slaughter of the animals, wherein the server application is further configured to train a machine learning algorithm to automatically provide an improved version of the analysis software, wherein the training comprises an analysis of the received combination made up of a digital image of the excretions and a measured manifestation of the performance indicator; and an electronic or mechanical system coupled to the computer system and configured to implement the recommended action, wherein the electronic or mechanical system is operatively coupled to one or more of a heating system for an animal barn, an air conditioning system for the animal barn, an automatic feeder system for the animal barn and a drinking water system for the animal barn, the recommended action causing the electronic or mechanical system to change one or more operational parameters of the one or more heating system, air conditioning system, automatic feeder system and drinking water system for the animal barn.

22. The system of claim 21 wherein the analysis software is configured to output a predicted manifestation of a performance indicator of one or more of the animals, wherein the performance indicator is a physiological parameter, a disease symptom, or a disease, wherein the predicted manifestation depends on a result of the analysis of the at least one image.

23. The system of claim 22 further comprising a feed additive with an indicator substance, wherein the indicator substance is a substance which causes a coloration in the excretions of the animals depending on physiological conditions in the metabolism of the animal, and wherein the analysis software is designed to predict the manifestation of the performance indicator and/or to calculate the recommended action on the basis of optical features of the excretions of animals, which received the indicator substance with food or drinking water before the recording of the at least one image.

24. The system of claim 21 further comprising one or more sensors configured for mounting in an animal barn or area in which the animals are kept, wherein the sensors are designed to record measured values and transmit them to the analysis software.

* * * * *